US008089619B2

(12) United States Patent
Cocchini et al.

(10) Patent No.: US 8,089,619 B2
(45) Date of Patent: Jan. 3, 2012

(54) PROCESS FOR MANUFACTURING A MICROSTRUCTURED OPTICAL FIBRE AND METHOD AND SYSTEM FOR ON-LINE CONTROL OF A MICROSTRUCTURED OPTICAL FIBRE

(75) Inventors: Franco Cocchini, Salerno (IT); Antonio Collaro, Torre del Greco (IT); Antonio Adigrat, Battipaglia (IT); Antonio Faraldi, Fisciano (IT); Francesco Di Matteo, Pugliano (IT); Paolo Russo, Conca dei Marini (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 12/226,908

(22) PCT Filed: Sep. 19, 2008

(86) PCT No.: PCT/EP2008/007925
§ 371 (c)(1),
(2), (4) Date: Oct. 31, 2008

(87) PCT Pub. No.: WO2010/031420
PCT Pub. Date: Mar. 25, 2010

(65) Prior Publication Data
US 2011/0157582 A1 Jun. 30, 2011

(51) Int. Cl.
*G01N 21/00* (2006.01)
(52) U.S. Cl. .............................. 356/73.1; 65/378; 65/382
(58) Field of Classification Search ................. 356/73.1; 65/378, 382
See application file for complete search history.

(56) References Cited

U.S. PATENT DOCUMENTS
3,982,816 A 9/1976 Watkins
(Continued)

FOREIGN PATENT DOCUMENTS
JP 61-215907 9/1986
(Continued)

OTHER PUBLICATIONS
International Search Report from the European Patent Office, International Application No. PCT/EP2008/007925 dated Jun. 16, 2009.

*Primary Examiner* — Tarifur Chowdhury
*Assistant Examiner* — Tara S Pajoohi
(74) *Attorney, Agent, or Firm* — Finnegan, Henderson, Farabow, Garrett & Dunner, L.L.P.

(57) ABSTRACT

A manufacturing process of a microstructured optical fiber including a void-containing region, includes the steps of: drawing a microstructured optical fiber along a longitudinal direction from a heated preform, wherein the optical fiber is continuously advanced along the longitudinal direction; directing a radiation beam at a longitudinal position in the longitudinal direction of the optical fiber so as to produce an interference pattern; detecting the interference pattern and producing at least one electrical detection signal corresponding to the interference pattern and including a plurality of signal fringe cycles; feeding the first detection signal into a first counter circuit; determining a first number of interference fringe increments in the plurality of signal wave fringe cycles of the at least one detection signal by using the first counter circuit; determining the outer diameter of the optical fiber, and controlling the microstructure of the optical fiber during advancement of the optical fiber. The step of controlling includes at least one step selected from: (a) controlling the first number of interference fringe increments within a reference number range of reference numbers of interference fringe increments, and (b) calculating a microstructure length value.

22 Claims, 10 Drawing Sheets

U.S. PATENT DOCUMENTS

| | | | |
|---|---|---|---|
| 4,046,536 A | | 9/1977 | Smithgall, Sr. |
| 4,067,651 A | * | 1/1978 | Watkins .................. 356/73.1 |
| 4,280,827 A | | 7/1981 | Murphy et al. |
| 5,185,636 A | | 2/1993 | Button et al. |
| 6,243,522 B1 | | 6/2001 | Allan et al. |
| 6,313,909 B1 | | 11/2001 | Frazee, Jr. et al. |
| 2002/0171823 A1 | | 11/2002 | Shurgalin et al. |
| 2003/0231296 A1 | | 12/2003 | Huang et al. |
| 2008/0138022 A1 | | 6/2008 | Tassone |

FOREIGN PATENT DOCUMENTS

| | | |
|---|---|---|
| JP | 2005-247621 | 9/2005 |
| WO | WO 2007/055881 A1 | 5/2007 |
| WO | WO 2008/005233 A2 | 1/2008 |

* cited by examiner

PROCESS FOR MANUFACTURING A MICROSTRUCTURED OPTICAL FIBRE AND METHOD AND SYSTEM FOR ON-LINE CONTROL OF A MICROSTRUCTURED OPTICAL FIBRE

CROSS REFERENCE TO RELATED APPLICATION

This application is a national phase application based on PCT/EP2008/007925, filed Sep. 19, 2008.

BACKGROUND OF THE INVENTION

1. Field of the Invention

The present invention relates to a method and system for controlling the microstructure of an optical fibre including a void-containing region. In particular, it relates to a method and system for monitoring the microstructure of an optical fibre along the fibre length during fibre drawing. According to an aspect, the present invention relates to a process for manufacturing a microstructured optical fibre.

2. Description of the Related Art

Holey or photonic crystal fibres have been studied in the last several years because of their properties that are rather different from the conventional fibres. Holey fibres are generally fabricated entirely of a single material, typically of bulk fused silica. The refractive index contrast between the core and the cladding of the optical fibre is achieved by incorporating a photonic crystal-like structure into the cladding. The pattern of holes, typically air-filled, leads to an effective lowering of the refractive index. Since only a small fraction of the transmitted light travels in the cladding, pure silica core fibres can potentially maintain the low loss of pure silica.

Holey or photonic crystal fibres can be manufactured in several different ways. One method, known as 'stack-and-draw', includes stacking silica capillary tubes inside a hollow glass cylinder in a close-packed space arrangement, welding the tubes together and then drawing the resulting preform by a conventional fibre preform drawing method.

U.S. Pat. No. 6,243,522 discloses a preform for making a photonic-crystal fibre, the preform having a core body surrounded by a clad layer formed by a plurality of clad rods. The clad rods have a central portion surrounded by a layer of larger refractive index. According to an embodiment, the preform is constructed by inserting clad rods, which are placed in a periodic array, and core rod into a hollow glass tube.

US patent application No. 2008/0138022 discloses a microstructured optical fibre made of a single, doped material matrix, preferably pure silica, having longitudinal holes forming two or three rings around the core, wherein the average distance between the holes is of at least 6 μM. The described fibre is said to be suitable for long-distance telecommunications, having a particularly reduced signal loss thanks to an optimised balance between Rayleigh scattering and radiation leakage through the cladding.

Very recently, a different class of microstructured optical fibres has been developed, the fibres including a solid central core surrounded by a hole-containing silica cladding, wherein the holes are arranged in a random or non-periodic spatial distribution.

WO patent application No. 2008/005233 discloses an optical fibre comprising a core region and a cladding region surrounding the core region, the cladding region comprising an annular hole-containing region comprised of non-periodically disposed holes. The core region and cladding region is said to provide improved bend resistance and single mode operation at wavelengths greater than or equal to 1500 nm, in some embodiments greater than 1260 nm. Preferred embodiments described in WO 2008/005233 disclose hole-containing regions that are spaced apart from the core of the optical fibre, but not extending entirely to the outer perimeter of the fibre.

WO patent application No. 2007/055881 describes a method of making a microstructured optical fibre comprising forming via chemical vapour deposition (CVD) operation a soot containing optical fibre preform. The soot preform is consolidated in a gaseous atmosphere which surrounds the preform under conditions which are effective to trap a portion of the gaseous atmosphere in the preform during said consolidation step, thereby resulting in the formation of non-periodically distributed holes or voids in the consolidated preform, each hole corresponding to a region of at least one trapped consolidated gas within the consolidated glass preform. At least some of the holes formed in the optical fibre preform during the consolidation step remain in the drawn optical fibre.

In generally known methods for making optical fibres, once the manufacturing of a preform is completed, the preform is lowered at a relatively low speed into a furnace having a hot zone in which the preform is melted at typical temperatures of 2000° C.-2200° C. so that the fibre lower end of the preform forms what is known as the neck-down region, where glass softens and is submitted to reduction in cross-sectional area to the desired cross-sectional area of the fibre. From the lower tip of this neck-down region, the optical fibre emerges where it can be gripped by a mechanical device.

Optical fibre technology requires characterization and control of various fibre properties during the process of drawing the fibre from a preform. In particular, fibre performance depends critically on the geometric uniformity and the dimensions of the core and cladding layers of the fibre. These fibre parameters are typically monitored during the drawing process without perturbing the fibre or the process. The outer diameter is generally measured at a point shortly after the fibre is formed (immediately below the neck-down region).

U.S. Pat. No. 3,982,816 discloses a method of measuring the outer diameter of an optical fibre by using a beam of coherent monochromatic radiation directed to the fibre to generate a far-field scattering pattern. A portion of the far-field scattering pattern results from radiation reflected from the outer surface of the fibre and radiation passing through the fibre and being refracted predominantly by the outer cladding. The number of fringes is counted between a lower scattering angle and an upper scattering angle in the particular portion of the scattering pattern. The outer diameter of the fibre is then calculated from the number of fringes.

U.S. Pat. No. 4,280,827 describes a fibre diameter measurement circuit including a source, a detector that senses the presence of interference fringes, wherein the detector signal is connected to two signal comparing means via a respective delay circuit connected to the source. The outputs from the signal comparing means are combined and counted in order to generate a succession of counts representative of the diameter of successive axial portions of the advancing fibre.

When a fibre is being drawn at or near its target diameter, the location of each fringe is predictable. Using this fact, holes have been detected by watching for a missing sequence of fringes of a prescribed user-settable length.

A method and apparatus for detecting defects in optical fibres based on different parameters from those used to measure fibre diameter is described in U.S. Pat. No. 5,185,636. A disclosed technique involves generating a spatial frequency spectrum for the detected pattern (i.e., the Fast Fourier Transform), which contains a line component to the outer diameter of the fibre. When the fibre contains a defect, the spectrum will contain a second component whose frequency (or frequencies, when split) is less than that of the line component corresponding to the outer diameter.

In U.S. Pat. No. 6,313,909 a scattered light signal is filtered and the resulting signal is compared to a defect detection threshold to determine the presence of defect-related components in the scattered light signal. A filter removes first and second components of the scattered light signal to generate a modified scattered light signal, wherein the first component corresponds to the fibre diameter measurement system and the second component corresponds to the outer diameter of the fibre; a defect sensitivity adjuster provides a defect detection threshold, wherein the defect detection threshold corresponds to a portion of a reference signal; and a comparator compares the modified scattered light signal to the detection threshold to determine if the defect-related component is present, the presence of the defect-related component being indicative of the presence of a defect in the fibre.

A detection device for determining defects in a fibre is disclosed in US patent application No. 2003/0231296. The device includes three bandpass filters: a regular airline filter, a clad diameter filter and a core airline filter. Scattered light is passed through the filters to generate three respective signals. The regular airline and clad diameter signals are compared to produce a normalised regular airline signal; the core airline signal and clad diameter signals are compared to produce a normalised core airline signal. A change in the strength of the normalised regular airline signal indicates the presence of a defect in the overclad region and change in the strength of the normalised core airline signal indicates the presence of a defect in the core region.

As described for instance in U.S. Pat. No. 3,982,816, on-line optical fibre inspection based on the analysis of light interference patterns in the far field produced by the light reflected and refracted from an optical fibre transversely illuminated by monochromatic light provide a direct relationship between the outer diameter of the fibre and the fringe count, when the refractive index of the fibre, and in particular of the fibre cladding, is substantially constant. In that case, the number of fringes counted in the interference pattern across a given angular range multiplied by an empirical conversion factor, which is mainly dependent on the setting parameters of the measurement system, provides the outer diameter.

Applicant has observed the following. Measurement methods as that described in U.S. Pat. No. 5,185,636, when used for on-line monitoring during fibre drawing, are typically set to detect structural defects, such as voids, as an anomaly in the fibre structure. Since microstructured optical fibres include deliberately-introduced defects, which generally are voids running longitudinally along the fibre axis, methods employing counting of the fringes of the as-detected far-field interference patterns seem not to be suitable to monitor the outer diameter of a microstructured fibre.

Optical fibres having a low-density region with a non-periodic, and in general random, distribution of voids (i.e., voids are irregular in their location within the region), the low-density region being disposed around the fibre core, and preferably in the fibre outer cladding, may be tailored to provide single-mode transmission and robust bend-resistance. Herein, the term void may indicate empty holes, air-filled holes or bubbles containing gases trapped within them, and in general a defect having a refracting index significantly smaller than that of the surrounding matrix, and generally having a refractive index equal or close to 1.

An optical fibre including a low-density region with a random void distribution can be advantageously manufactured during formation of the preform by a sintering process in which gases with low-solubility in the materials forming the fibre, usually silica-based materials, remain trapped and form voids. The preform can be manufactured in two main steps: first, a glass core rod including the preform core, which is preferably void-free, is produced by deposition and then consolidated, and, second, a preform outer cladding is formed around the glass core rod by deposition and then consolidated to form voids within the preform outer cladding. The resulting consolidated preform typically exhibit an annular low-density region including a random distribution of voids, which starts at about the interface between the core rod and the outer cladding and extends radially within the outer cladding for a certain thickness. Thickness of the low-density annular region, hereafter also referred to as the void-containing ring, and local void density within the ring may widely vary in dependence on the sintering process conditions, such as consolidation time, temperature gradient in the furnace and percentage of volume of low-solubility gases during consolidation.

The drawing process following the formation of the preform, in which the preform glass flows from the original cross-sectional area of the preform to the desired cross-sectional area of the fibre, inevitably have an effect on the voids, the main one expected to occur being a stretching of the voids along the longitudinal axis of the drawn fibre.

SUMMARY OF THE INVENTION

Applicant has noticed that drawing conditions, such as temperature in the neck-down region and pulling tension, may induce a contraction or even a collapse of some of the voids present in the preform, and/or a coalescence of adjacent voids. It follows that structural analyses performed in the preform may not be sufficient for a characterisation of the microstructured optical fibre. Furthermore, the actual ring thickness and the local void density may vary along the fibre length, due to non uniformity along the preform length, for instance different longitudinal sections of the preform may have experienced a different thermal history, and/or to drawing conditions.

Applicant has observed that it would be advantageous to find a method and a system that allow a fast and simple measurement of structural properties concerning voids along the fibre length, thereby enabling control and possible adjustment of the fibre microstructure. It would be in particular advantageous to monitor structural properties concerning voids of an optical fibre during drawing.

Optical access networks, and in particular fibre-to-the-home (FTTH) networks, which provide a number of users with broadband communication services, often require the use of single-mode optical fibres with low bending loss of optical signals transmitted through the fibres. Bend-resistant fibres, i.e., fibres exhibiting low macrobending losses, are typically used in those applications.

Applicant has observed that, in a microstructured optical fibre with a random-void distribution, the thickness of the void-containing region and the local density of the voids primarily determines the bend resistance of the optical fibre. Notably, bend resistance has been seen to be directly correlated with the product of the local void density and the area of the void-containing region. Therefore, it would be very important to control the morphology and size of the void-containing region in order to assure that the optical fibre has the desired optical bending performances.

Applicant has found that the far-field interference pattern generated by radiation passed through a microstructured fibre can provide useful information on some relevant structural characteristics of the fibre. In particular, the number of fringe increments, $N_A$, comprised in the fringe cycles, which can be directly counted in the signal detected from the interference pattern generated from a microstructured optical fibre, is related to the structural properties of the fibre. The fibre microstructure can be controlled by comparing the number of fringe increments $N_A$ with a reference number of fringe increments, $N_A^t$, or more generally with reference number range of reference numbers, wherein the reference number (range) is related to some desired fibre microstructure in the fibre and thus to some desired bending performance. The reference numbers comprised within the reference number range are smaller than the number of fringe increments $N_D$ associated with the outer diameter.

In some embodiments, it may be advantageous to analyse the product $K \cdot_A$, with K a conversion factor in length units, K, generally empirical, the product providing a dimensional value in length unit, which will be indicated as the microstructure length value or "apparent" diameter, $d_A$. The microstructure length value can be compared with a reference microstructure length value, $d_A^t$, or more generally with a range of values, which is smaller than the fibre (true) outer diameter d, in order to determine whether the microstructured optical fibre has the desired microstructure and thus the desired bending performance.

Within the present description and appended claims, the term "microstructure parameter" may indicate the number of fringe increments $N_A$ or the microstructure length value $d_A$.

Advantageously, the microstructure measurement method described above can be used during fibre drawing to monitor the uniformity/change of the microstructure of the advancing fibre and/or to tailor the microstructure to some desired optical properties, such as macrobending.

According to an aspect, the present invention relates to a process for manufacturing a microstructured optical fibre comprising a void-containing region, the fibre having an outer surface defining an outer diameter d, the process comprising the steps of:

drawing a microstructured optical fibre along a longitudinal direction from a heated preform, wherein the optical fibre is continuously advanced along the longitudinal direction;

directing a radiation beam at a longitudinal position in the longitudinal direction of the optical fibre so as to produce an interference pattern;

detecting the interference pattern and producing at least one electrical detection signal corresponding to the interference pattern and comprising a plurality of signal wave fringe cycles;

feeding the first detection signal into a first counter circuit; determining a first number of interference fringe increments $N_A$ in the plurality of signal wave fringe cycles of the at least one detection signal by using the first counter circuit;

determining the outer diameter d of the optical fibre; and controlling the microstructure of the optical fibre during advancement of the optical fibre, wherein the step of controlling comprises at least one step selected from:

(a) controlling that the first number of interference fringe increments $N_A$ is comprised within a reference number range of reference numbers of interference fringe increments $N_A^t$, the reference numbers $N_A^t$ being smaller than a second number of interference fringe increments $N_D$ related to the outer diameter d of the microstructured optical fibre by a conversion factor K, and (b) calculating a microstructure length value $d_A$ by multiplying the first number of interference fringe increments $N_A$ by a conversion factor K and controlling that the value of the microstructure length value $d_A$ is comprised within a reference length range of reference microstructure length values $d_A^t$, the reference microstructure length values being smaller than the outer diameter d of the microstructured optical fibre.

According to a further aspect, the present invention relates to a method for controlling a microstructured optical fibre comprising a void-containing region, the fibre having an outer surface defining an outer diameter d and extending along a longitudinal direction, the method comprising the steps of:

directing a radiation beam at a longitudinal position of the optical fibre so as to produce an interference pattern;

detecting the interference pattern and producing at least one electrical detection signal corresponding to the interference pattern and comprising a plurality of signal wave fringe cycles;

feeding the at least one detection signal into a counter circuit;

determining a first number of interference fringe increments $N_A$ in the plurality of signal wave fringe cycles of the at least one detection signal by using the counter circuit, and controlling the microstructure of the optical fibre, wherein the step of controlling comprises at least one step selected from:

(a) controlling that the first number of interference fringe increments $N_A$ is comprised within a reference number range of reference numbers of interference fringe increments $N_A^t$, the reference numbers being smaller than a second number of interference fringe increments $N_D$ related to the outer diameter d of the microstructured optical fibre by a conversion factor K, and (b) calculating a microstructure length value $d_A$ by multiplying the first number of interference fringe increments $N_A$ by a conversion factor K and controlling that the value of the microstructure length value $d_A$ is comprised within a reference length range of reference microstructure length values $d_A^t$, the reference microstructure length values being smaller than the outer diameter d of the microstructured optical fibre.

According to a still further aspect, the present invention relates to a microstructure control system for controlling a microstructured optical fibre extending along a longitudinal direction, having an outer surface defining an outer diameter d and comprising a void-containing region, the control system comprising:

a light source for generating a radiation beam to be directed onto a longitudinal position of the microstructured optical fibre so as to form an interference pattern;

at least one detector for detecting the interference pattern and for producing a first and a second electrical detection signal corresponding to the interference pattern, each first and second detection signal comprising a plurality of signal wave fringe cycles;

a first counter circuit for receiving the first detection signal, the first counter circuit being apt to determine a first number of interference fringe increments $N_A$ in the plurality of signal wave fringe cycles of the first detection signal;

an electrical filter for filtering the second detection signal and apt to remove the signal components related to the void-containing region from the second detection signal and to produce a filtered signal having a substantially unperturbed plurality of interference fringe cycles;

a second counter circuit for receiving the filtered signal, the second counter circuit being apt to determine a second number of interference fringe increments $N_D$ in the plurality of signal wave fringe cycles of the filtered signal, the second number being related with the outer diameter d of the microstructured optical fibre.

Advantageously, the reference microstructure length values $d_A^r$ (or $N_A^r$) of the reference range are selected to be comprised between 0.6 and 0.9 times the outer diameter d ($N_D$); preferably comprised between 0.64 and 0.84 times the outer diameter d ($N_D$), and more preferably comprised between 0.7 and 0.8 times the outer diameter d ($N_D$). It has been observed that, within the given preferred ranges, improved bending performances of the microstructured optical fibre, e.g., macrobending losses of less than 0.5 dB (and preferably of less than 0.2 dB), can be obtained while ensuring single-mode transmission at wavelengths larger than about 1250-1260 nm.

For an optical fibre having a core region and an outer cladding region including a void-containing annular region (ring), the detected number of fringe increments, $N_A$, counted in an interference pattern received from the fibre, and thus the fibre microstructure length value derived from $N_A$, has been found to be in direct correlation with the product of the ring thickness times the local density of voids within the ring.

According to some embodiments, measurement of the outer diameter is performed during fibre drawing. In some preferred embodiments, measurement and/or control of the outer diameter of the fibre is performed by analysing the same interference pattern received from the microstructured fibre, which is used to control the morphology of the optical fibre. Preferably, measurement of outer diameter is carried out by electrically filtering the detection signal corresponding to the interference pattern so as to cut-off the signal contributions of the detection signal due to the presence of voids and to obtain a substantially unperturbed interference pattern signal, in which the counted number of fringe increments, $N_D$, is related with the fibre outer diameter d by $d = K \cdot N_D$, with K the conversion factor.

It is noted that the influence of drawing on the final distribution and size of the voids can be present also in holey or photonic optical fibres, generally including an array of periodic holes, produced by other methods, such as "stack-and-draw" methods. Therefore, the manufacturing process, method and system according to the invention can be used for control and monitoring of holey or photonic optical fibres.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

DEFINITIONS

In the description, the following parameters are defined in accordance with the common usage in the art, and specifically:

Cut-off wavelength of a single-mode fiber is the wavelength above which the fiber propagates only the fundamental mode. Below cut-off the fiber will transmit more than one mode.

Cable cut-off wavelength ($\lambda_{cc}$) is the cut-off wavelength value measured according to the standard 22 m fiber cut-off test method described in the IEC-60793-1-44 standards (method A). Namely, the method prescribes to perform the measurement on a 22 m of uncabled fiber span, where the central 20 m portion of the fiber is wound on a 280 mm-diameter mandrel and one turn of each of the two 1 m-long lateral portions is wound on a 80 mm-diameter mandrel.

MAC number is defined as the ratio between the mode field diameter (MFD) measured at 1310 nm, in microns, and the cable cut-off wavelength ($\lambda_{cc}$), in microns.

Macrobending loss (in dB) is the attenuation increase at 1625 nm measured in a fibre wound for one turn on a 15-mm diameter mandrel.

The relative refractive index is a percent value defined as $\Delta_i = 100 \times (n_i^2 - n_0^2)/2n_i^2$, where $n_i$ is the maximum refractive index in the i-region and $n_0$ is the refractive index of pure silica ($SiO_2$).

BRIEF DESCRIPTION OF THE DRAWINGS

Reference will now be made in detail to the present preferred embodiments of the invention, examples of which are illustrated in the accompanying drawings.

DETAILED DESCRIPTION OF THE INVENTION

Figure 1:
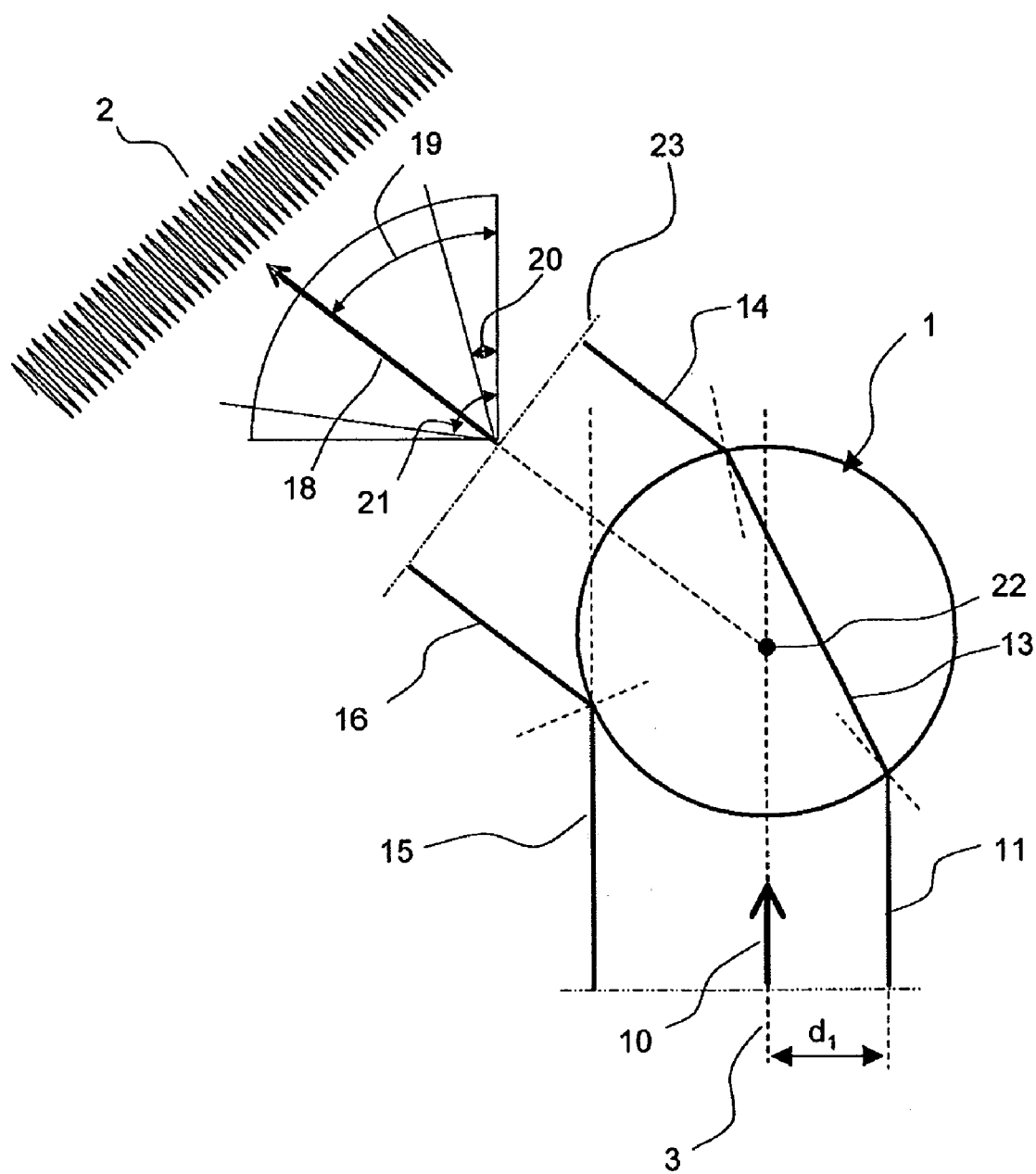
FIG. 1 is a schematic diagram illustrating the principles of far-field interference scattering typically used for measuring the outer diameter of an optical fibre.

FIG. 1 is a schematic diagram illustrating the principles of far-field interference scattering typically used for measuring the outer diameter of an optical fibre. A radiation beam 10, which can be produced by an optical source, such as a laser source (not shown), is directed to an optical fibre 1, which is shown in the figure in a cross-section perpendicular to the fibre main longitudinal axis 22, which passes through the centre of the fibre. The laser source preferably generates monochromatic and coherent light at an incident wavelength. The incident direction 3 of beam 10 is transverse to the fibre axis 22, and preferably perpendicular to it, and generates a far-field scattering pattern on a reference plane 23 placed at a certain distance from the fibre, the interference pattern being created by the interference between the radiation reflected from the outer surface of the fibre and the radiation refracted by the fibre. The intensity of the scattered light, as a function of the scattering angle, measured in the forward direction from the incident radiation forms the interference pattern.

In particular, an incident ray 11 spaced of a distance $d_1$ from the fibre axis 22, which is less than the fibre radius, is refracted in ray 13 inside the fibre, and in the refracted ray 14 outside the fibre. The refracted ray 14 interferes with a reflected ray 16, which is reflected from a ray 15 incident on the fibre outer surface. The interference is constructive or destructive depending on the difference of the optical path of the refracted ray (which is given by the sum of the optical paths 11, 13 and 14) and of the reflected ray (which is given by the sum of the paths 15 and 16). The exemplary refracted ray 14 and reflected ray 16 have the same direction 18, characterized by a scattering angle 19. An interference pattern 2 can be collected within a certain angular range $\Delta\theta=(\theta_{max}-\theta_{min})$, from a lower scattering angle 20, referred to as $\theta_{min}$, to an upper scattering angle 21, referred to as $\theta_{max}$, on a detector (not shown in FIG. 1), for example an array of photodiodes or a screen of a liquid crystal display (LCD) camera or of a CCTV camera, the detector generating the signal to be processed.

The number of fringes counted between the lower scattering angle 20, and the upper scattering angle 21 is known to be proportional to the diameter of a fibre with no significant presence of defects or holes in the fibre i.e., with a substantially constant refractive index of the outer cladding.

Figure 2:
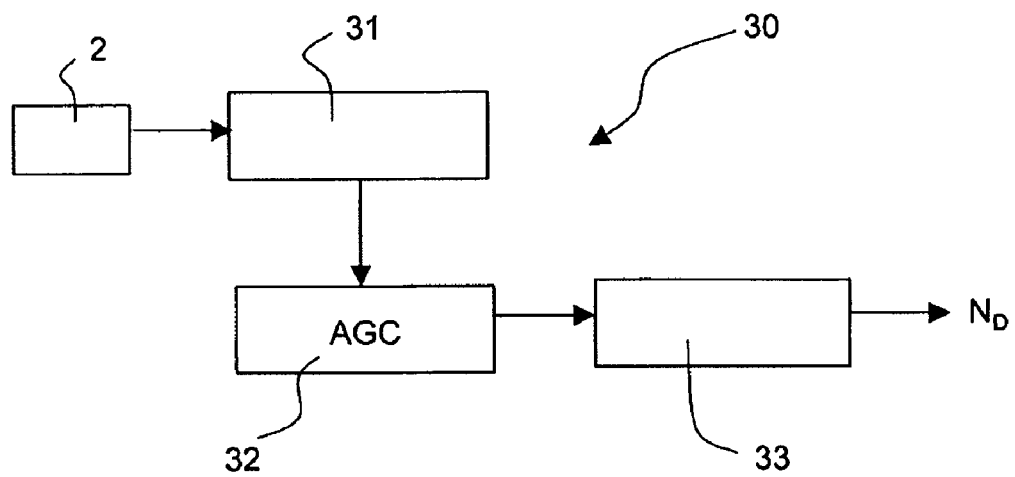
FIG. 2 is a block diagram of an illustrative apparatus for measuring the outer diameter from far-field scattering patterns.

FIG. 2 a block diagram of an illustrative apparatus 30 for measuring the outer diameter of an optical fibre. The interference pattern 2, also schematically indicated in FIG. 1, is collected by a detector 31, e.g., a LCD or a CCTV camera. The electrical detection signal generated by the detector 31, e.g., a video signal if received from a CCTV camera, is preferably coupled to an Automatic Gain Control (AGC) circuit 32 in order to obtain an approximately constant amplitude across the entire pattern, i.e., to flatten the scattering angle dependence of the intensity of the scattered light. The amplitude-equalized signal is sent to a counter circuit 33, which may include electrical phase comparators, signal shapers, summers, and counters, all per se known, but not necessarily all of them present in the counter circuit. The counter circuit 33 computes the number of fringe cycles of the detection signal corresponding to the interference pattern (optionally equalized in amplitude). In order to improve resolution, counter circuits preferably count fringe increments that constitute a fraction of a fringe cycle. In the present embodiment, the counter circuit has the resolution of counting ¼ of each fringe cycle, in other words a fringe increment of ¼ fringe cycle. For instance, for a standard single-mode optical fibre of 125 μm of diameter, about $N_D$=750¼ fringes (fringe increments) may appear in a typical "unperturbed" interference pattern in the angular range comprised between about $\theta_{mm}$=20° and about $\theta_{max}$=80°.

Figure 3:
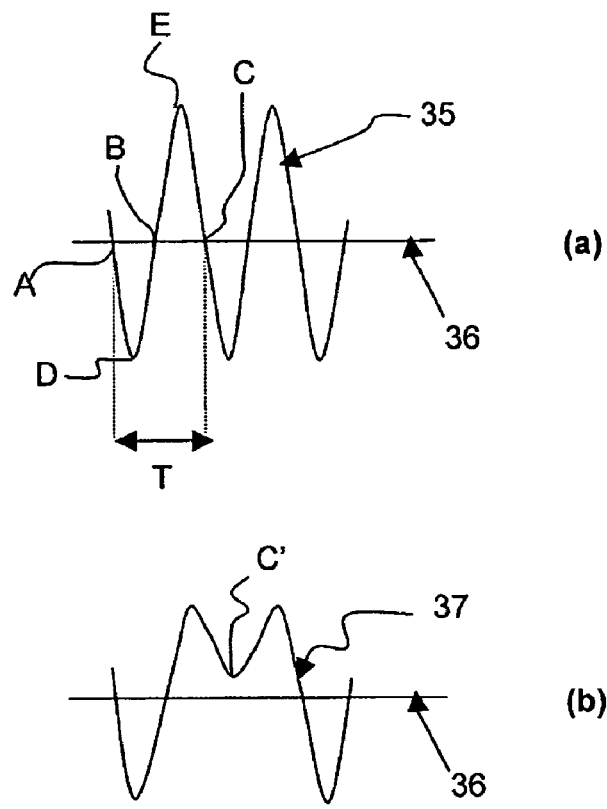
FIG. 3 is a schematic representation of a small portion of a unperturbed interference pattern (a) originating from a defect-free optical fibre and a perturbed interference pattern (b) originating from an optical fibre containing low-density defects.

FIG. 3(a) illustrates a small portion of an exemplary electrical detection signal 35 resulting from detection of an unperturbed interference pattern. The detection signal, which can be an analog or digital electrical signal, generally comprises a plurality of signal wave fringe cycles. For example, the detector 31 outputs an analog output signal that is passed through an analog-to-digital converter (not shown in FIG. 2) for digitisation in order to produce a digital detection signal. In the example shown in the figure, the detection signal 35 has an approximately sinusoidal shape. The counter circuit 33 is responsive to a change in the signal level above or below a certain threshold from a reference position indicated with line 36, which, for simplicity, can be taken to be zero. Thus, the counter is responsive to the zero crossing of the signal and is able to compute the number $N_D$ of ¼ fringe increments of the interference pattern. In the unperturbed pattern 35, fringes are well resolved and each fringe cycle is counted as four ¼ fringes, i.e., segments AD, DB, BE and EC. A fringe period T can be defined as the space interval to complete one fringe cycle, i.e., from point A to C of the reference line 36.

Given a substantially constant refractive index of the optical fibre experienced by the incident beam, which in practice, for single-mode fibres, implies a substantially constant index of the fibre outer cladding, and an incident beam at a given wavelength, the number of counted fringe increments $N_D$ multiplied by an empirical constant, K, provides the fibre outer diameter, d, i.e., $d=K\cdot N_D$. The empirical constant K is a conversion factor in length unit that typically depends on the settings of the measurement apparatus, such as the range of the angular range of collection, and can be for example of about 0.167 μm.

FIG. 3(b) provides an exemplary illustration of an electrical detection signal 37 resulting from the detection of a "perturbed" interference pattern (only a small portion is represented), which contains "incomplete" fringe cycles that may result from detection of void-like defects within the optical fibre. In the example of FIG. 3(b), the signal of the first fringe element at point C' does not return back to the reference line 36. In this case, the counter circuit is not able to discriminate the central ¼ fringe increments, since it does not detect a sufficiently large change in the signal level from the reference position, and thus those central fringe increments will be missed in the counting. Therefore, the number of fringe increments counted in the "perturbed" interference pattern signal is smaller than $N_D$.

Applicant has recognised that measurement of the interference pattern received from a microstructured optical fibre including a low-density region can provide relevant information on the structural properties of the fibre, which can be directly correlated with the bending performance of the fibre. In particular, Applicant has understood that control of relevant optical parameters of a microstructured fibre, such as the macrobending, can be performed by controlling the number of fringes appearing in the interference pattern received from the fibre.

A measurement system such that described with reference to FIG. 2 can provide the number of fringe increments, $N_A$, counted in the perturbed interference pattern received from the microstructured optical fibre, thereby providing relevant information on its microstructure. The determined number of fringe increments can be compared with a reference (or target) number of fringe increments, $N_A^t$, which corresponds to some desired microstructure properties of the optical fibre and thus to some desired bending performance. The reference number of the fringe increments, $N_A^t$, has a certain relationship with the number of fringe pattern, $N_D$, associated with the outer diameter of the fibre and is smaller than $N_D$.

More generally, a control of the microstructure of the optical fibre can be performed by controlling that the number of fringe increments $N_A$ is comprised within a reference number range of reference numbers of the fringe increments, $N_A^t$, the reference number range being smaller than $N_D$, i.e., the largest reference number of the reference number range being smaller than $N_D$.

In some embodiments, it can be advantageous to define a microstructure length value, $d_A$, which is a dimensional value in length unit associated with the microstructured optical fibre. Within the present description, for sake of brevity, the microstructure length value will be referred also to as the "apparent" diameter of the microstructure fibre. The term "apparent" is used because the value has no geometrical meaning of a real fibre diameter. In practice, the value of the "apparent" diameter, $d_A$, is equal to $K \cdot N_A$, where K is the conversion factor proper of the measurement system and that would provide the outer diameter of the fibre were the detected interference pattern unperturbed (i.e., in particular, with substantially no missing fringe increments). Measured values of the apparent diameter can be compared to a reference value in length unit, i.e., the reference microstructure length value, or more generally to a reference range of microstructure length values, which are in relation with the actual (true) outer diameter d of the fibre in order to derive the structural information.

It is to be understood that, within the present invention, the determined number of interference fringe increments or the determined apparent diameter can be compared with a single relevant reference value or with a range of relevant values, i.e., ranging from a lowest to a highest reference value, so as to control whether the determined values lie within the range.

In particular, it has been found that for an optical fibre having a core region and an outer cladding region and containing an annular region (ring) within the outer cladding region containing voids, the detected number of fringe increments, $N_A$, (and thus $d_A$) is in direct correlation with the product of the ring thickness times the local density of voids within the ring.

Although it is preferred to count the fringe increments that constitute a fraction of fringe cycles in order to improve resolution of the control method, such as fringe increments of ¼ fringe cycle, the present invention encompasses a method and system in which a fringe increment may be taken to correspond to a fringe cycle.

Figure 4:
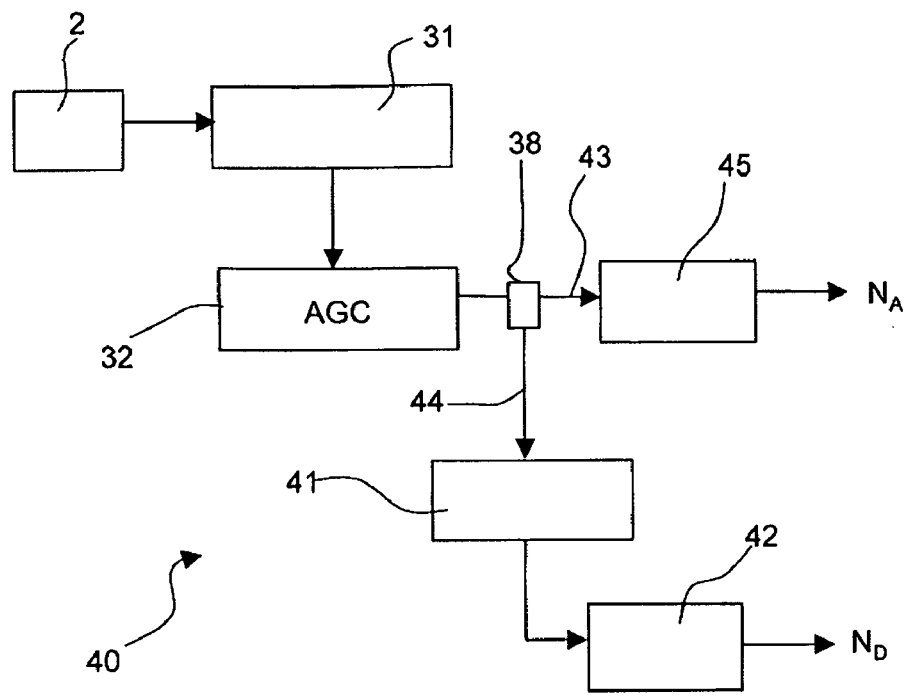
FIG. 4 is a block diagram of a microstructure control system in accordance with an embodiment of the present invention.

FIG. 4 is a block diagram schematically representing a microstructure control system in accordance with an embodiment of the present invention. Like numbers are used to identify like components having the same or similar functions as those described with reference to FIG. 2.

In the microstructure control system 40, the interference pattern 2 received from a microstructured fibre is collected by detector 31. At the output of the AGC 32, the amplitude-equalized signal detected from detector 31 is divided, for instance by means of a splitter 38, into two signals: a first detection signal 43 that is fed to a first counter circuit 45 and a second detection signal that is passed through an electrical filter 41 and then fed to a second counter circuit 42. The electrical filter 41 and its function within the control system 40 will be detailed below.

Counter circuit 45 counts the number of fringe increments in the fringe cycles of the interference pattern as detected by detector 31, with optional amplitude equalization of the detection signal. Due to the presence of a microstructure and in particular of a low-density region containing voids, the number of fringe increments, $N_A$, counted in the signal derived from the interference pattern cannot be associated to the outer diameter of the optical fibre.

However, in the presence of a void-containing region in the fibre, location of the fringes and their spacing remains correlated with the outer diameter of the fibre, at least for voids having average size significantly smaller than the outer diameter of the fibre.

Figure 6:
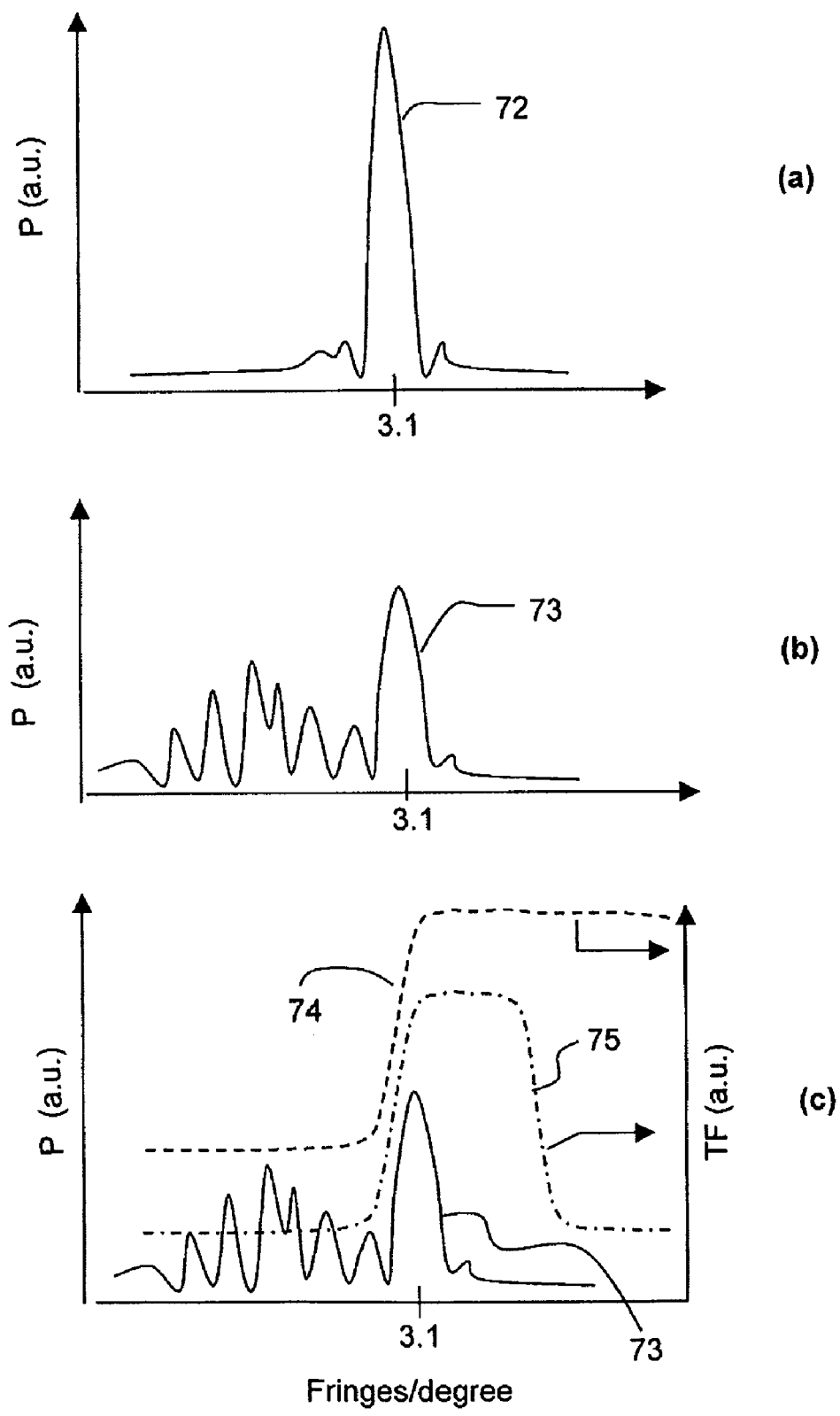
FIGS. 6(a) to (c) show exemplary frequency spectra of the far-field interference pattern within a scattering angle of 60° for a 125 μm standard fibre, i.e., containing no voids (a) and of a 125 μm microstructured fibre including a void-containing region (b). In (c), the transfer function (TF) of an exemplary high-pass filter and an exemplary pass-band filter (right scale) applied to the detection signal is compared to the frequency spectrum of the microstructured fibre reported in (b) (left scale).

FIG. 6(a) shows an exemplary frequency spectrum, expressed in detected power (P, arbitrary units) vs. fringes/degree, of a scattered light signal from an optical fibre containing no defects, i.e., having an interference pattern of the type shown in FIG. 3(a). The frequency spectrum can be obtained by applying a Fast Fourier Transform (FFT) of the detection signal (normally averaged among a number of signals acquired with a fast scan repetition rate, e.g., of a few ms). Spectrum 72 of FIG. 6(a) exhibits only one strong peak centred at the "fundamental" frequency, $f_D$, of about 3.1 fringes/degree. In the experimental set-up considered in the example, the frequency peak value is the result of 187 counted fringe cycles, N, (corresponding to $N_D$=750 for counted increments of ¼ fringe cycles) in a collection angular range, $\Delta\theta$, of 60°, i.e., $f_D = N/\Delta\theta$. The power peak and thus the frequency $f_D$ are associated with the fibre outer diameter, d. For sake of completeness, the frequency spectrum may comprise a second distinguished power peak (not shown in FIG. 6) generated from the scan repetition rate of the images collected by the detector. However, this second peak is typically positioned at much lower frequencies and with much lower power than that originated by the outer diameter so that, within the purpose of the present discussion, the frequency spectrum of FIG. 6(a) can be considered to have a single strong power peak.

FIG. 6(b) shows an exemplary frequency spectrum of a scattered light signal from an optical fibre including a void-containing region. Due to the presence of voids, additional spectral components appear in the frequency spectrum 73. In particular, besides a well-distinguished peak at the fundamental frequency of 3.1 fringes/degree associated to the fibre outer diameter, the frequency spectrum exhibits other peaks at frequencies lower than the fundamental frequency. In case of microstructures comprising voids with average diameter of not more than about 2-3 μm, and for a percentage of void content in the total fibre cross-section of not more than about 10%, the "fundamental" peak generally appears as the strongest peak in the spectrum.

Applicant have understood that by removing the spectral components generated by the defects in the frequency spectrum of FIG. 6(b), it would be possible to measure the outer diameter of the fibre by a direct analysis of the interference spectrum, e.g., without the need of calculating a Fourier transform of the detection signal.

Defect-related spectral components are typically located at frequencies smaller than the fundamental frequency, and they can be removed by means of a high-pass electrical filter. In FIG. 6(c), the frequency spectrum 73 of FIG. 6(b) is reported (left scale), while curve 74 represents the electrical transfer function (TF, right scale, arbitrary units) of a high-pass filter having a −3 dB cut-off frequency selected so as to substantially remove the spectral components present at frequencies smaller than that associated with the outer diameter.

In some embodiments, the −3 dB cut-off frequency of the high-pass filter is comprised between a value from about 80% to about 90% the value of the fundamental frequency, $f_D$, of the peak associated with outer diameter. A value of the cut-off frequency closer to the value of the fundamental frequency, i.e., the difference between $f_D$ and the cut-off frequency, can be, in some embodiments, less preferred as slight variations (of a few %) in the fundamental frequency, due for instance to fluctuations of the fibre outer diameter, may occur during fibre drawing. Preferably, the −3 dB cut-off frequency of the electrical filter is from 80% to 86% the value of the fundamental frequency of the peak associated with outer diameter.

In some embodiments, the high-pass filter has a power attenuation of at least 30 dB at a frequency at least 30% smaller than the fundamental frequency. Relatively sharp power attenuations can be obtained by properly selecting a filter with electrical transfer function exhibiting an abrupt cut-off edge, as known in the art. In the example reported in FIGS. 6(a) to (c), in which the fundamental frequency is of 3.1 fringes/degree, the high-pass filter can have −3 dB cut-off frequency of about 2.7 fringes/degree and, for frequencies not larger than 2.0 fringes/degree, a −40 dB of power attenuation.

Alternatively, in order to remove defect-related spectral components from the frequency spectrum of a microstructured fibre, a band-pass electrical filter can be used. FIG. 6(c) shows an exemplary transfer function 75 (right scale) of a pass-band electrical filter. The edge of the pass band of the transfer function corresponding to a positive slope is located with respect to the frequency spectrum of the scattered light so that the −3 dB point on the edge with positive slope (i.e., the left edge of the pass band) is 80-90% and preferably 80-86% the value of the fundamental frequency.

In an embodiment, the central frequency of the pass band is selected to approximately correspond to the fundamental frequency. In that case, the −3 dB bandwidth of the pass-band filter (or full-width at half maximum) is preferably selected in order to have the pass band edge with positive slope to be positioned between $0.8f_D$ and $0.9f_D$. In general, the filter bandwidth should be selected so as to allow the fundamental peak of the signal to pass through substantially undisturbed.

Exemplary electrical transfer functions 74 and 75 reported in FIG. 6(c) are shown shifted with respect to one another and with respect to the frequency spectrum along the ordinate to improve clarity of the figure.

In the space-domain, electrical filtering of the signal detected from a microstructured fibre for removal of the frequency components originated from the presence of voids produces a signal composed of well-resolved fringes, albeit with an average intensity smaller than that of the unfiltered detection signal. From the filtered detection signal it is possible to infer the number of fringe increments, $N_D$, which is associated with the outer diameter.

In practice, one way to select a suitable electrical filter for the outer diameter measurement is to calculate from the frequency spectrum of the scattered signal the value of the fundamental frequency in Hz from the value in fringes/degree units. Conversion between the two units mainly depends on the electronic parameters used for sampling of the interference pattern. For example, 187 fringe cycles are recorded with a sampling rate of 500 Hz (or sampling time intervals of 2 ms). Within the sampling time interval, a dead time amounting to 0.4 ms is present for routine electronic control. Reading of the 187 fringe cycles is thus performed in an actual sampling interval of 1.6 ms, which corresponds to a frequency of about 117 kHz. In this case, for example, an active $8^{th}$-order analog band-pass Butterworth filter, centred at 115 kHz and with −3 dB bandwidth of 30 kHz can be selected as electrical filter 41. Attenuation of the Butterworth filter at frequencies not larger than 70 kHz and not smaller than 180 kHz is at least of 40 dB, whereas attenuation at frequencies not larger than 90 kHz and not smaller than 145 kHz is at least 20 dB.

Referring back to FIG. 4, counter circuit 42 counts the number of fringes of the filtered signal, thus of the signal being substantially cleared from the defect-related frequency components, resulting in the space-domain in an interference pattern of well-resolved fringes passing across the reference line. Therefore, the number of fringe increments $N_D$ output from counter circuit 42 provides a measurement of the fibre outer diameter, d, which is given by the product of $K \cdot N_D$, where K is the conversion factor. Notably, the value $N_D$ (or the value d) provides a reference signal associated with a reference fibre having the same outer diameter of the microstructured fibre under analysis, but being solid, i.e., containing no voids.

The system of FIG. 4 allows measurement of both $N_A$ and $N_D$ or of both $d_A$ and d, and thus of $N_A/N_D$ or $d_A/d$. Assuming a value of $N_D$ and, thus of d, approximately constant, e.g., 125±1 μm, the value of the apparent diameter $d_A$ (or of $N_A$) provides direct information on the morphology of the void-containing region. Measurement of $d_A$ and d can be carried out concurrently since both measurements result from the acquisition of the same interference pattern.

According to an embodiment, the data related to the numbers of fringe increments $N_A$ and $N_D$ are provided to a control unit (not shown in FIG. 4), e.g., a conventional processor, which processes the data outputs from the first and second counter. In particular, the control unit controls that the numbers of fringe increments $N_A$ (or the value of the apparent diameter derived from $N_A$) lies within a reference range of values being in a certain relation with $N_D$ (or with the fibre outer diameter d).

Figure 5:
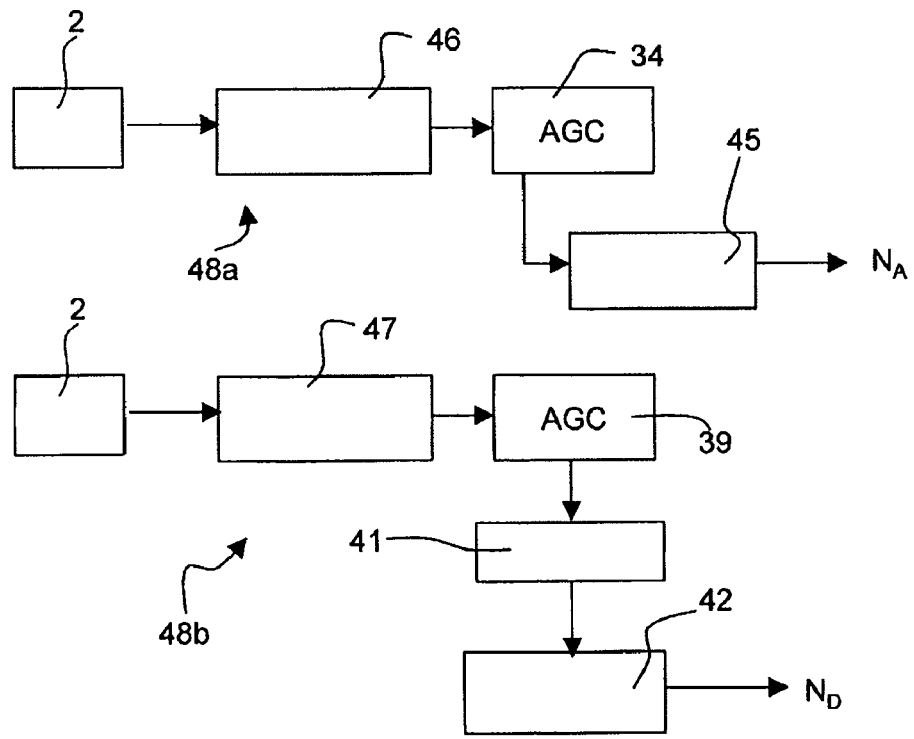
FIG. 5 is a block diagram of a microstructure control system in accordance with another embodiment of the present invention

FIG. 5 is a block diagram schematically representing a microstructure control system in accordance with another embodiment of the present invention. Like numbers are used to identify like components having the same or similar functions as those described with reference to FIGS. 2 and 4. In the embodiment of FIG. 5, measurement of $N_A$ and of $N_D$ is carried out by employing a system having two control systems, a microstructure control system 48a and an outer diameter control system 48b. The microstructure control system 48a comprises a first detector 46 that detects the interference pattern 2 received from the microstructured optical fibre and outputs a first detection signal that is used, optionally after having been equalized in amplitude by AGC 34, to count the number of fringe increments $N_A$ by means of counter circuit 45, as described with reference to FIG. 4. The outer diameter control system 48b comprises a second detector 47 that, as the first detector 46, detects the interference pattern 2 received from the microstructured optical fibre and outputs a second detection signal, which passes through an electrical filter 41, optionally after having been equalized in amplitude by AGC 39, and is then fed to a counter circuit 42 in order to determine the number of fringe increments $N_D$.

Conventional bending loss measurements of the fibre in order to determine the performance of the optical fibre, such as imaging of the fibre cross-section, can be time-consuming and can be performed only on limited spans of the optical fibre, which are usually few meters long. Advantageously, the present method and system allow a quick and reliable measurement and control of the morphology of the void-containing region associated with the bending performance of the fibre, without perturbing the fibre.

It has been observed that a microstructured optical fibre, which has a standard outer diameter of 125 μm and which includes a void-containing region extending in the outer cladding, with an apparent diameter, $d_A$, comprised between 80 μm and 110 μm exhibits improved macrobending resistance, while maintaining single mode propagation at wavelengths above 1250-1260 nm. Preferably, $85\ \mu m \leq d_A \leq 105\ \mu m$, more preferably $90 \leq d_A \leq 100\ \mu m$.

More generally, improved bending resistance has been found for values of ratio between the apparent diameter and the outer diameter of the fibre, $d_A/d$, (or $N_A/N_D$) comprised between 0.6 and 0.9, preferably between 0.64 and 0.84, more preferably between 0.7 and 0.8.

In some embodiments, selection of a suitable value of $d_A$ or $N_A$ within the above ranges can be made in dependence of geometrical parameters of the microstructured optical fibre, such as the core-to-clad ratio, defined more in detail below. According to an embodiment, for optical fibres having core-to-clad ratio between about 0.30 and about 0.36, $d_A/d$ is preferably selected to be comprised between 0.7 and 0.8. According to another embodiment, for optical fibres having core-to-clad ratio larger than about 0.36 and smaller than about 0.5, $d_A/d$ is preferably selected to be comprised between 0.64 and 0.84.

Optical fibre microstructure control can be carried out at different longitudinal positions along the fibre longitudinal direction during the drawing process so that it is possible to monitor the uniformity/change of the low-density region along the fibre length and/or adjust some drawing parameters in order to tailor the microstructure of the fibre to the desired bending performance. In particular, when used during fibre drawing, the method and system of the invention can assure that an appropriate morphology of the void-containing region is maintained along the whole fibre length.

Figure 7:
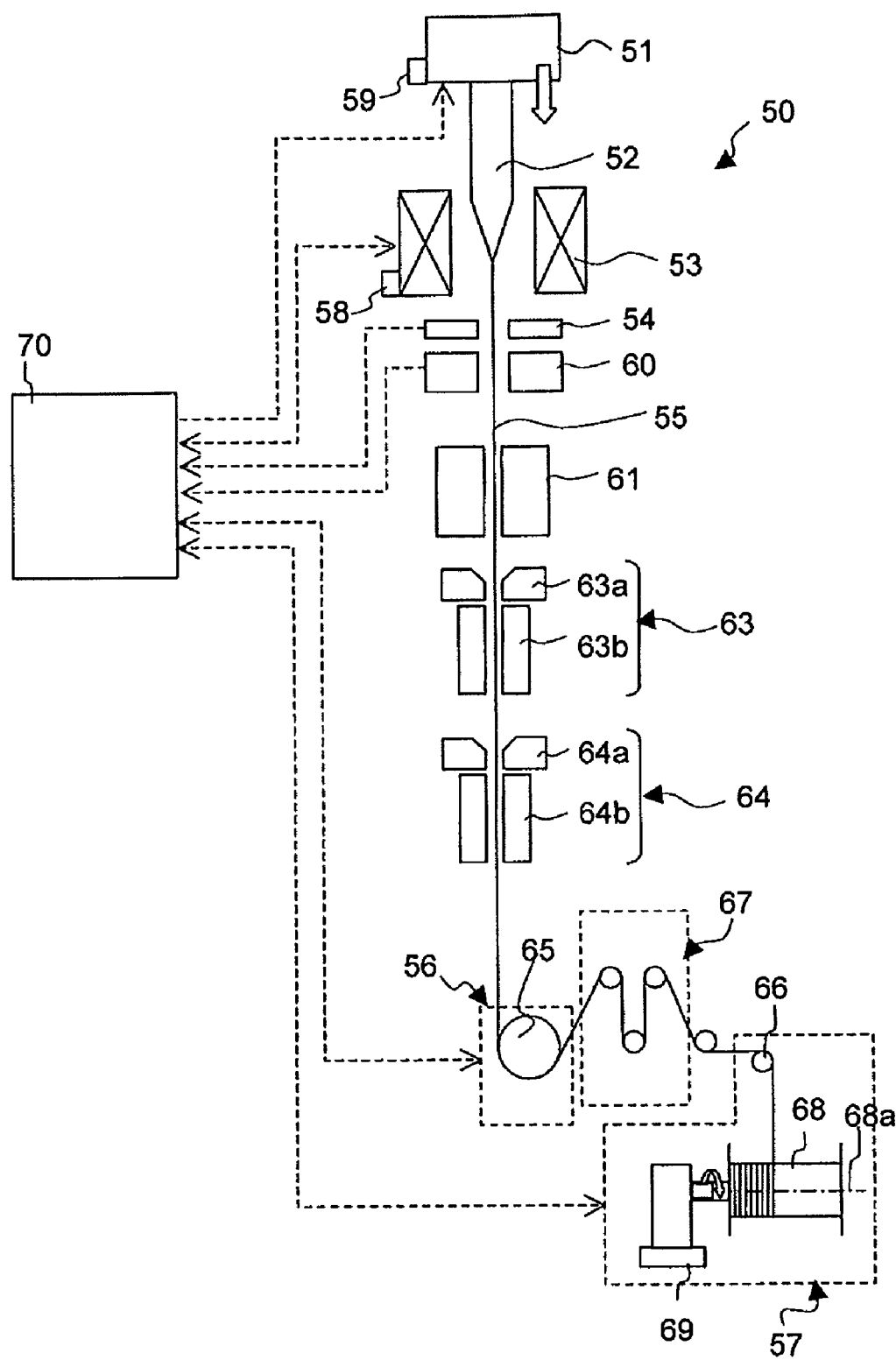
FIG. 7 shows a drawing tower for an optical fibre manufacturing process in accordance with the principles of an aspect of the present invention.

FIG. 7 illustrates a diagram of a drawing tower for drawing a preform into an optical fibre and for carrying out a manufacturing process according to an embodiment of the present invention. Drawing tower 50 comprises a plurality of components that are substantially aligned in a vertical drawing direction (hence the term "tower"). The choice of a vertical direction in order to perform the main steps of the drawing process arises from the advantage to make use of the gravitational force so as to obtain, from the glass preform 52, molten material from which an optical fibre 55 can be drawn. In detail, the tower 50 comprises a device 51 for supporting and supplying the preform 52, a melting furnace 53 for performing a controlled melting of a lower portion of the preform 52, i.e., the neck-down region. Support device 51 may comprise a preform position sensor 59, providing a signal indicative of the normalized longitudinal coordinate of the portion of the preform 52 that is melting in that instant. Drawing tower 50 further comprises a traction device 56 for pulling the fibre 55 from the preform 52 and a device 57 for winding the fibre 55 around a reel 68. The glass preform 52 contains an annular region containing voids, preferably located within the preform outer cladding, so as to produce a microstructured optical fibre including an annular void-containing region.

The furnace 53 may be provided with a temperature sensor 58 designed to generate a signal indicative of the temperature inside the furnace. The furnace temperature, typically in the range 2000-2200° C., is a process parameter that may be slightly varied during the drawing process, in order to vary the drawing tension. At the exit of the furnace 53 a tension-monitoring device 54, designed to generate a signal indicating the tension of the fibre 55. Device 54 may be also positioned differently along tower 50, in particular in any position between furnace 53 and traction device 56.

The drawn optical fibre is a microstructured fibre. According to an embodiment of the present invention, the drawing tower 50 comprises at the exit of furnace 53 a microstructure control system 60 based on the scattered signal produced by far-field interference patterns originated from the microstructured optical fibre 55. In the embodiment of the figure, the microstructure control system 60 is positioned underneath the tension monitoring device 54, but it can take any position between furnace 53 and traction device 56, and in particular between the furnace and the coating device(s), detailed below. In an embodiment, the control system 60 is of the type described with reference to FIG. 4 or 5 and thus can perform measurement and control of the fibre microstructure and of the fibre outer diameter.

According to another embodiment, microstructure measurement system 60 comprises a detector for detecting the interference pattern and a counter circuit providing the value of $N_A$ or of the apparent diameter, $d_A$ (e.g., a system as that of FIG. 2). Measurement of the outer diameter of the fibre can be obtained by a different monitoring apparatus (not shown in the figure), for instance based on the shadow technique, per se known.

It is however noted that a system such that described with reference to FIG. 4 has the additional advantage of being of simple implementation in the drawing tower and allows the concurrent measurement of the fibre diameter and of the fibre microstructure by the analysis of the same control signal, i.e., the output detection signal output from detector 31.

Referring again to FIG. 7, a cooling device 61 may be arranged underneath the microstructure measurement system 60 and may, for example, be of a type having a cooling cavity designed to be passed through by a flow of cooling gas. The cooling device 61 is arranged coaxially with respect to the drawing direction, so that the fibre 55 leaving the furnace 52 can pass it through. The cooling device 61 may be provided with a temperature sensor (not shown) designed to provide an indication of the temperature in the cooling cavity. Since the speeds at which an optical fibre is drawn are usually relatively high, the cooling device 61 generally provides rapid cooling of the fibre 55 to a temperature suitable for the successive processing steps and, in particular, suitable for the coating application on the fibre outer surface.

In the exemplary drawing tower 50, first and a second coating device 63, 64, are disposed underneath the cooling device 61 in the vertical drawing direction and designed to deposit onto the fibre 55, as it passes through, a first protective coating and, respectively, a second protective coating overlapping the first one. Each coating device 63, 64 comprises, in particular, a respective application unit 63a, 64a which is designed to apply onto fibre 55 a predefined quantity of resin, and a respective curing unit 63b, 64b, for example a UV-lamp oven, for curing the resin, thus providing a stable coating. A single coating device, e.g., producing a single-layered coating, can be also envisaged to be provided in the drawing tower.

The traction device 56 is positioned underneath coating devices 63, 64. In the illustrated embodiment, the traction device 56 comprises a motor-driven capstan 65 that rotates about its axis in order to pull the coated fibre in the vertical drawing direction. The speed of rotation of the capstan 65 and, therefore, the drawing speed of the fibre 55 during the drawing process, is a process parameter that may be varied during drawing.

In the case where, during the drawing process, undesired variations in the microstructure parameter ($d_A$ or $N_A$) of the fibre 55 occur, a control signal may be used to vary automatically the drawing speed of the fibre 55, i.e., the rotation speed of the capstan 65, so as to bring the value of the microstructure parameter within a predefined range.

For instance, during the drawing process, if the microstructure parameter is reduced to below a predefined threshold (e.g., a value $d_A^t$ or $N_A^t$, which may correspond to the minimum value of a predefined range), the drawing speed is decreased by an amount proportional to the reduction in apparent diameter, whereas if the apparent diameter is increased above a further predefined threshold (which may correspond to a maximum value of the predefined range), the drawing speed is increased by an amount proportional to the increase in apparent diameter.

Alternatively, or in addition, variations in the apparent diameter (or in $N_A$) can be carried out by acting on a different drawing parameter, such as by varying at least one of the parameters selected from the melting furnace temperature, the gas (e.g., He) flow within the furnace, and the down-feed speed, i.e., the speed with which the preform is lowered in the melting furnace.

In some preferred embodiments, the fibre manufacturing process comprises a step of controlling the outer diameter of the optical so as to draw a microstructured optical fibre with an approximately constant outer diameter.

Preferably, in case at least a first drawing parameters is varied in order to modify the measured value of microstructure parameter, at least a second drawing parameter is adjusted so as to maintain an approximately constant value of the fibre outer diameter. According to an embodiment, drawing conditions are adapted to maintain the outer diameter to a value 125 μm±1 μm.

In a preferred embodiment, in case the microstructure parameter is determined to lie outside a predefined range of length values, the drawing speed is changed to move the value of the microstructure parameter back into the predefined range while the down-feed speed is modified to maintain the outer diameter at a target value d.

In some preferred embodiments, the fibre manufacturing process comprises a step of controlling the drawing tension of the fibre so as to draw a microstructured optical fibre with an approximately constant tension, possibly an average tension value having a given tolerance (e.g., of 10-20%), as significant variations in the drawing tension may affect the optical properties of the fibre. According to an embodiment, drawing conditions are adapted to maintain the drawing tension to a value 90 g±20 g.

For example, in case the determined microstructure parameter is determined to lie outside a predefined range of length values, the drawing speed is changed to move the value of the microstructure parameter back into the predefined range and the temperature furnace is modified to maintain the draw tension at a target value.

According to a preferred embodiment, in case at least a first drawing parameters is varied in order to modify the measured microstructure parameter, a second and a third drawing parameters are adjusted, possibly independently of one another, so as to maintain an approximately constant value of the fibre outer diameter and an approximately constant value of drawing tension. Preferably, the step of adjusting the drawing tension is performed by varying the furnace temperature and the step of adjusting the outer diameter is performed by varying the down-feed speed.

According to an embodiment, the microstructure control system 60 is of the type described with reference to FIG. 4 or 5. The determined values $N_A$ and $N_D$ are provided as input data to a control unit 70. Within the control unit 70, the value of microstructure parameter is calculated and compared with a predefined range of reference values, e.g., $d_A^t$ ranging from 0.8 to 0.9 times the target diameter value. In addition, within the control unit 70, the fibre outer diameter is calculated from the determined number $N_D$ and is compared to a target value. If the determined value of the microstructure parameter lies outside the predefined range, a first output signal is generated to adjust at least one drawing parameter to correct the microstructure length value. If the determined value of d is different than the target value, a second output signal is generated to adjust at least one second drawing parameter to correct the diameter.

The control unit 70 can receive as an input the values of the drawing tension measured by the tension monitoring device 54. If, as a consequence of the variation of at least one of the first and the second drawing parameters, the value of drawing tension measured is different than the target (range of) value, a third output signal is generated to adjust at least one third drawing parameter to correct the drawing tension.

If adjustment of the microstructure parameter by acting on at least one first drawing parameter would lead to a significant variation of the outer diameter and/or of the drawing tension, compensation of the variation of the outer diameter and/or of the draw tension so as to restore the target values is performed by acting on at least one drawing parameter. Preferably, compensation of both outer diameter and drawing tension is performed by acting at least on two drawing parameters.

The control unit 70 is electrically connected to the sensors and detectors present along the tower 50, and in particular to the microstructure control system 60 and the monitoring tension device 54, whose operation may be controlled from the outside.

Drawing tower 50 may also comprise a device 67 for adjusting the tension of the fibre downstream the traction device 56. Device 67 is designed to counterbalance any variations in tension of the fibre between capstan 65 and winding device 57 and to maintain the tension constant. Winding device 57 comprises a reel 68 and a motorized device 69 for supporting and moving the reel 68. The reel 68 has an axis 68a and defines a cylindrical support surface for the coated optical fibre. Winding device 57 also comprises a fibre-feeding pulley 66; during the process of winding of fibre, the controlled movement of pulley 66 allows helical winding of fibre to be performed.

According to some preferred embodiments, fibre length portions that are monitored not to satisfy the conditions of a selected value of apparent diameter, $d_A$, can be "marked" during drawing, preferably by changing the winding pitch of winding device 57, so that those length portions can be discarded from the optical fibre during a subsequent rewinding steps. This would allow to obtain an optical fibre product with the desired bending performance along virtually 100% of the fibre length. According to an embodiment, marking can be used to identify different length portions of the optical fibre having different microstructural characteristics and which can thus be used for different applications.

In an embodiment, marking of length portions of the optical fibre can be carried out by using a meter counter and by registering in a processor the positions of the different length portions in the winding reel.

Figure 8:
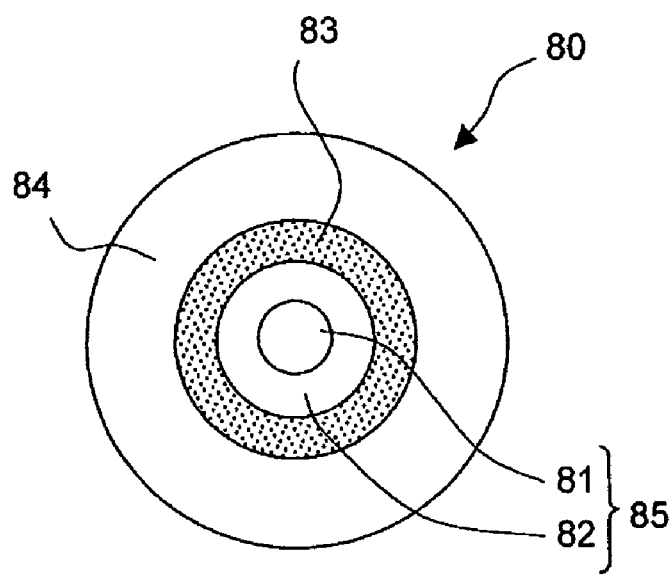
FIG. 8 schematically illustrates a cross-section of a microstructured optical fibre, on which the microstructure control system can be applied, according to some embodiments of the present invention.

In some preferred embodiments, the present invention is particularly adapted to control a microstructured optical fibre including a core region surrounded by an outer cladding region, the outer cladding region comprising an void-containing annular region (ring). FIG. 8 schematically illustrates a cross-section of a microstructured optical fibre 80 comprising a core region 85 formed by a core 81 and an inner cladding layer 82 surrounding the core 81. Core region 85 is surrounded by an outer cladding region 84 that includes a void-containing annular region (ring) 83. Ring 83 is preferably arranged in proximity of the inner cladding 82 such that the inner diameter (ID) of the annular region 83 corresponds to the outer diameter of the inner cladding layer 82. Voids are distributed across ring 83 in a non-periodic or random arrangement. Preferably, the core region 84 is solid, i.e., void-free.

Figure 9:
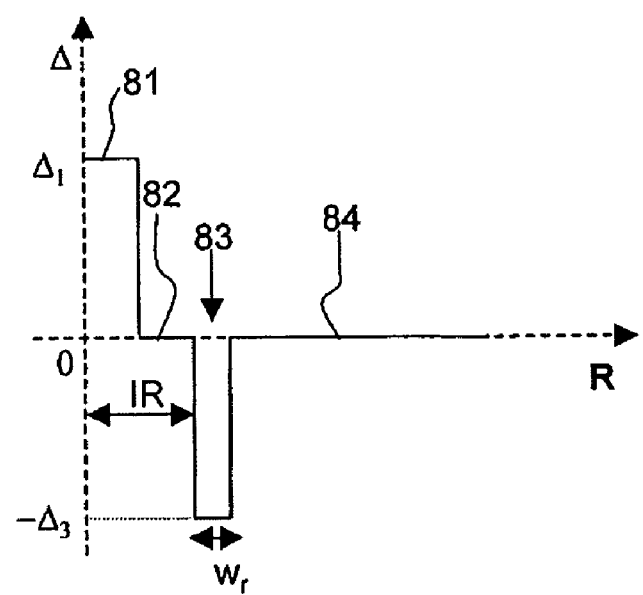
FIG. 9 is a schematic diagram of a possible relative refractive index profile of the fibre of FIG. 8.

FIG. 9 is a diagram illustrating the relative refractive index profile of the microstructured optical fibre, according to an embodiment, as a function of the radial distance R from the centre of the fibre (R=0). Given that the outer cladding of single-mode optical fibres used for transmission is generally made of pure (undoped) silica, the relative index profile takes as a reference the refractive index of the outer cladding. In the embodiment of FIG. 9, the outer cladding region 84 is of pure silica, $\Delta_0$=0. The fibre core 81 is preferably made of silica doped with a doping element that increases the refractive index, such as germanium, so as to form a step-index profile with positive relative refractive index $\Delta_1$. In some embodiments, $\Delta_1$ is comprised between 0.30% a 0.35%, preferably between 0.31% and 0.34%. In some embodiments, core 81 can be made of a plurality of segments having positive relative refractive index.

The inner cladding layer 82 is preferably made of the same material as that of the outer cladding region, which is preferably of pure silica. The annular region or ring 83 extends radially from the outer radius of the inner cladding layer 83 within the outer cladding region for a radial width, $w_r$, which is herein referred to as the thickness of the annular region (or of the ring). The presence of voids across the ring decreases the refractive index resulting in an average negative relative refractive index, of absolute value $\Delta_3$, whose magnitude is seen to depend on the local void density. It has been observed that the average depression of the relative refractive index, or the product ring thickness times the local void density, can be directly correlated with the apparent diameter of the fibre (or the number of fringe increments $N_A$).

In FIG. 9, the inner radius (IR=ID/2) of the void-containing ring taken from the fibre centre to the inner cladding-ring boundary is indicated. A geometrical parameter that represents the radial distance from the low-density ring to the core is the core-to-clad diameter (radius) ratio, defined as the ratio between the outer diameter (radius) of the core and the inner diameter (radius) of the ring. In general, the core-to-clad ratio of the preform is preserved in the drawn optical fibre.

In some embodiments, the local void density of the microstructured fibre is comprised between about 1% and 10%. The local density of voids, i.e., within the void-containing region, is defined herein as the ratio between the total area of the voids in the region and the total area of the region, when the optical fibre is viewed in a cross-section taken perpendicular to the fibre longitudinal axis. In some embodiments, the ring thickness is comprised between 2 μm and 20 μm, preferably between about 3 and 10 μm.

Example 1

The optical fibre preform was produced according to the following process (hereafter referred to as process A). About 1000 grams of silica soot was deposited by Outside Vapour Deposition (OVD) process onto a $GeO_2$-doped silica glass rod with step index profile of the core, $\Delta_1$ equal to about 0.31%, and core-to-clad diameter ratio of about 0.31. The soot cladding was sintered by down driving in a hot zone at 1490° C. of a consolidation furnace, at a 10° C./min temperature increase and in 50% He-50% $N_2$ (by volume) atmosphere. The assembly was then down driven a second time through the same hot zone at a 5° C./min temperature increase in 50% He-50% $N_2$ (by volume) atmosphere. The preform was then placed for 24 h in an oven at 1000° C. in an atmosphere containing argon. Nearly 6000 grams of silica soot was then deposited on the perform and sintered in a standard way in He atmosphere in order to form the outer cladding layer portion external to the void-containing ring.

The preform manufactured according to process A was placed in a drawing tower equipped with a microstructure control system as described with reference to FIG. 4. The fibre outer diameter of the drawn fibre was maintained at 125±1 μm by monitoring the filtered scattering signal.

Figure 10:
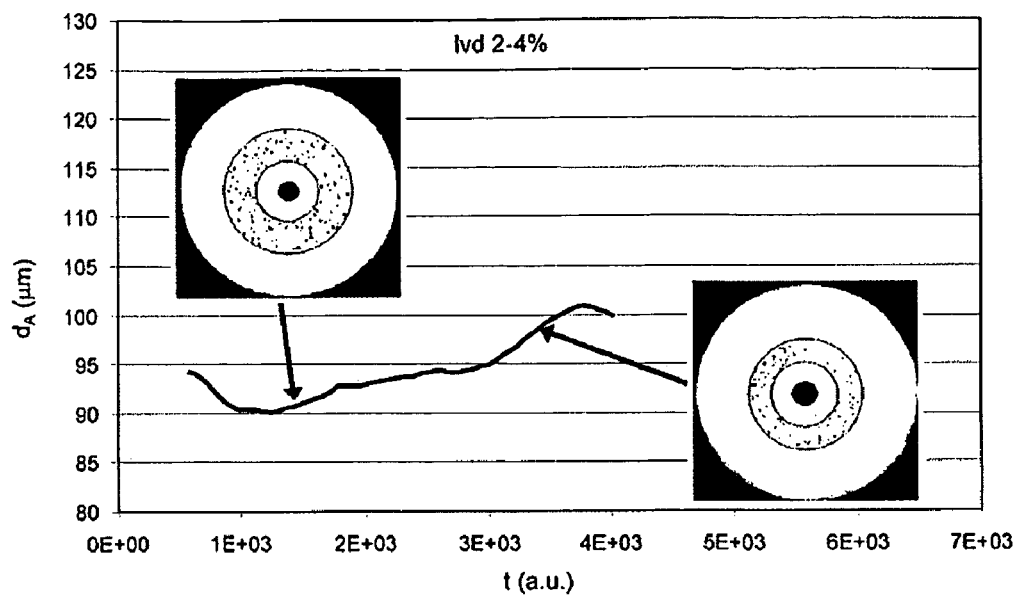
FIG. 10 is a plot of the apparent diameter ($d_A$) measured during drawing versus time of a microstructured optical fibre having local void density (lvd) of 2-4%.

FIG. 10 is a plot of the apparent diameter versus drawing time measured during drawing of the microstructured optical fibre obtained by drawing a preform obtained according to process A. Within the drawing time interval reported in the figure, which corresponds to the drawing of a fibre length of 150 km, the apparent diameter is not constant, but it is seen to initially decrease and then to start increasing after a certain drawing time. A change in the apparent diameter can be caused by non-uniformity of the microstructure in the preform along its longitudinal direction, e.g., due to sintering conditions (such as the thermal history of different parts of the preform), and/or to drawing conditions, such as the drawing speed, the pulling tension and the furnace temperature.

Several span lengths of the drawn optical fibre were measured off-line, after completion of the drawing process The internal structure of the optical fibre, and in particular the thickness of the annular region and the local void density within the annular region, was performed by cutting the optical fiber to be examined in portions of about 2 m length and by observing the cross section thereof through a microscope or television camera. In particular, the PK 2400 measuring instrument produced by the Photon Kinetics company was used, in which light at 633 nm from a light source is converged in the core of the fibre, according to the measurement procedure specified by the European standard IEC-793-1-A2. Two images of the cross-section, taken in the fibre span lengths corresponding to the drawing time indicated in the figure, are reported as inserts in the plot of FIG. 10.

From the off-line structural measurements of the optical fibre, it is observed that process A has produced an optical fibre having a local void density from 2% to 4%. Fluctuations within the given range may be due, besides to the preform non uniformity, to the random nature of voids in the ring. The average diameter of the voids is of about 1±0.9 μm. Within this range of local void density, a change in the apparent diameter is principally correlated with a change in the ring thickness. The low-density ring has a larger thickness in the fibre portion associated with lower values of apparent diameter (left image), whereas it has a smaller thickness in the fibre portion associated with higher values of apparent diameter (right image).

Example 2

Several optical fibre preforms were manufactured by the following process, hereafter referred to as the process B. From 200 to 300 grams of silica soot was deposited by a OVD process a $GeO_2$-doped silica glass rod with step index profile of the core, $\Delta_I$ equal to about 0.31%, and core-to-clad diameter ratio of about 0.31. The soot cladding was sintered by down driving in a hot zone at 1490° C. of a consolidation furnace, at a 100° C./min temperature increase and in 100% $N_2$ (in volume) atmosphere. The assembly was then driven a second time through the same hot zone at a 50° C./min temperature increase in 100% $N_2$ atmosphere. The assembly was then driven a third time through the hot zone at a 26° C./min temperature increase followed by a fourth time down driving at a 13° C./min temperature increase. The assembly was then driven a fifth time through the hot zone at a 7° C./min temperature increase. The assembly was then driven a sixth time through the hot zone at a 3.5° C./min temperature increase. The preform was then placed for 24 h in a oven at 1000° C. in an atmosphere containing argon.

Nearly 7000 grams of silica soot was then deposited on the preform and sintered in a standard way in helium atmosphere.

Each preform manufactured according to process B was placed in a drawing tower equipped with a microstructure control system as described with reference to FIG. 4. The fibre outer diameter of the drawn fibre was maintained at 125±1 μm.

FIG. 10 is a plot of the apparent diameter versus time measured during drawing of microstructured optical fibres, numbered from #1 to #4 obtained by drawing four preforms manufactured according to process B.

Off-line measurements, described in example 1, show that the average local void density in the fibres drawn from preform obtained from process B ranges between about 8% and 10%. The average diameter of the voids is of about 1±0.9 μm.

Figure 11:
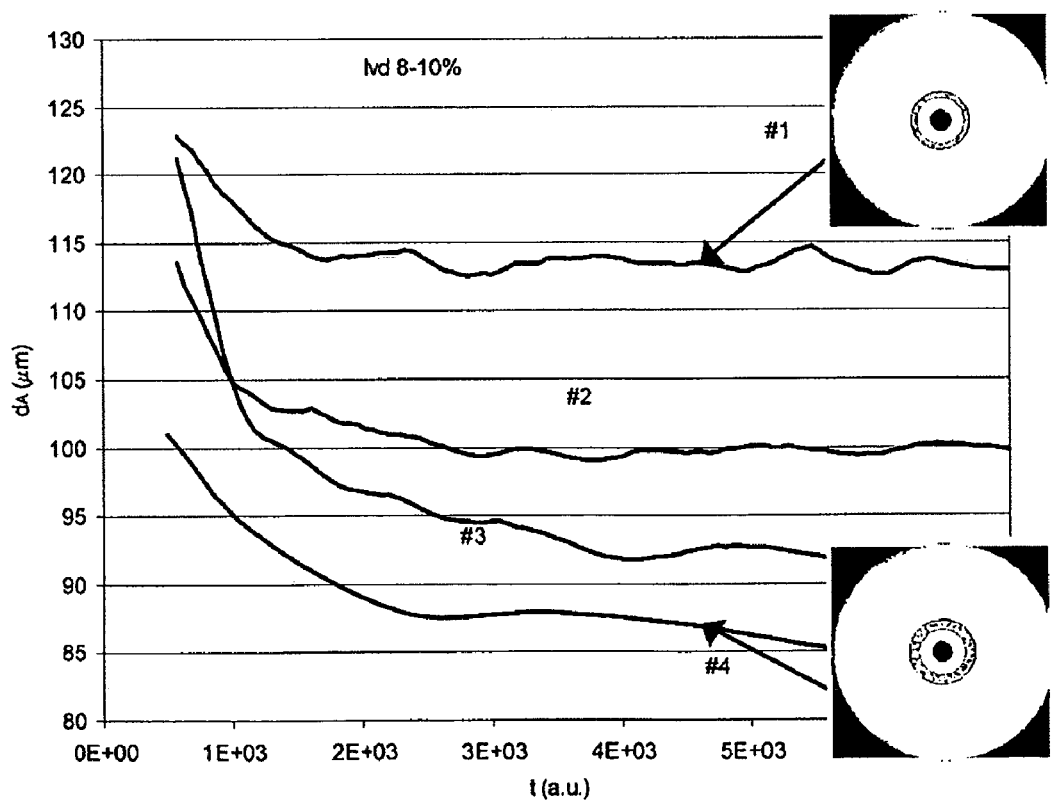
FIG. 11 is a plot of the apparent diameter measured during drawing versus time of four different microstructured optical fibres having local void density of 8-10%.

Optical fibre #1, uppermost curve of the plot of FIG. 11, exhibits an apparent diameter that remains above the value of 110 μm and is stabilised at a value ranging between about 113 and 115 μm. For a local void density of 8-10%, the ring thickness was observed to be not larger than about 3 μm (insert image on the top right of the plot). Macrobending losses of fibre #1 may be larger than about 1 dB, a value that may be not acceptable if the fibre is to be used in FTTH applications.

Optical fibre #2 shown in FIG. 11 has an apparent diameter that, after an initial relatively large value, takes values of about 100 μm during drawing. Without wishing to be bound by theory, initial high values of macrobending losses are likely due to non uniformity of the consolidation process at the end portions of the preform.

Optical fibres #3 and #4 exhibit, on average, a smaller apparent diameter than optical fibre #2, the values of fibre #4 (lowermost curve) being the lowest. The small image inserted on the bottom right of the plot is a cross-sectional view of fibre #4. Average ring thickness is 5-6 μm (insert image on the bottom right of the plot). Macrobending losses for fibre #4 are not larger than 0.1 dB.

Figure 12:
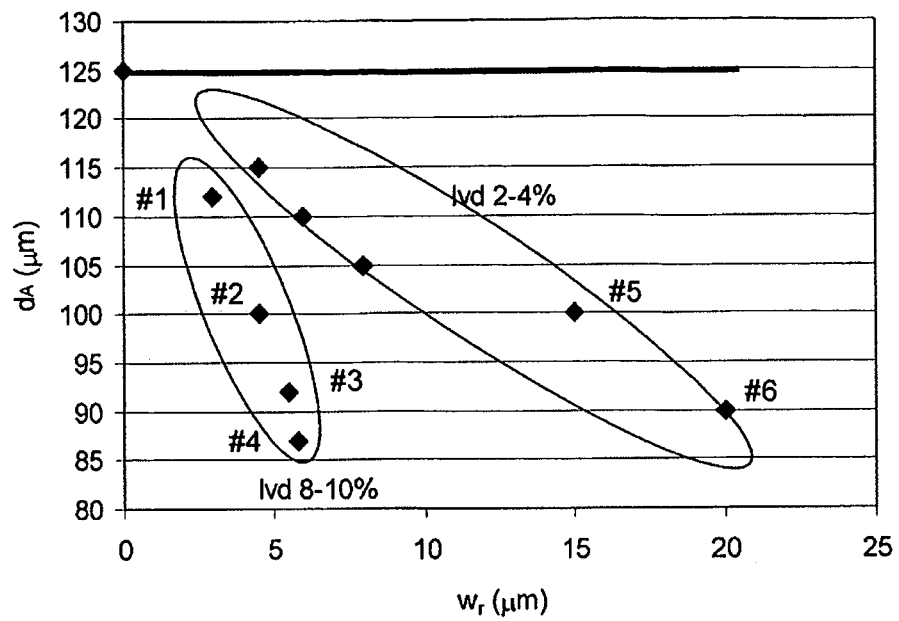
FIG. 12 is a plot showing the correlation of the apparent diameter with the ring thickness for two ranges of local void density.

FIG. 12 is a plot showing the correlation of the apparent diameter, $d_A$, with the ring thickness, $w_r$, for two ranges of local void density, i.e., 2-4% and 8-10%. Ring thickness is measured by taking several span lengths of optical fibre and forming an image of the end cross-section of each span length, as described more in detail with reference to Example 1. Depicted ellipses in FIG. 12 graphically represent the correlation between the apparent diameter and the ring thickness for a given local void density range. The outer diameter of the fibre is indicated in the figure with a thick line at 125 μm.

Applicant has recognised that in an optical fibre with standard outer diameter of 125 μm and having a structure of the type shown in FIG. 8, improved macrobending resistance and single-mode operation for wavelengths above 1250 nm is associated with an apparent diameter, $d_A$, comprised between 80 μm and 110 μm and preferably comprised between 85 μm and 105 μm, more preferably between 90 and 100 μm.

It is emphasized that measurements of the apparent diameter (or of $N_A$) are very easily implemented and of fast acquisition, making unnecessary a systematic use of lengthily off-line analyses of the cross-sectional structure of the optical fibre. For instance, with reference to FIG. 11, from the apparent diameter acquired during drawing, it is possible to know that an initial span length of fibres #2 and #3 should be discarded in order to obtain a final product having in virtually 100% of the fibre length the desired macrobending properties.

Macrobending losses are often related to the so-called MAC number of an optical fibre, since, generally speaking, a reduction of the MAC number leads a decrease in bending losses.

Figure 13:
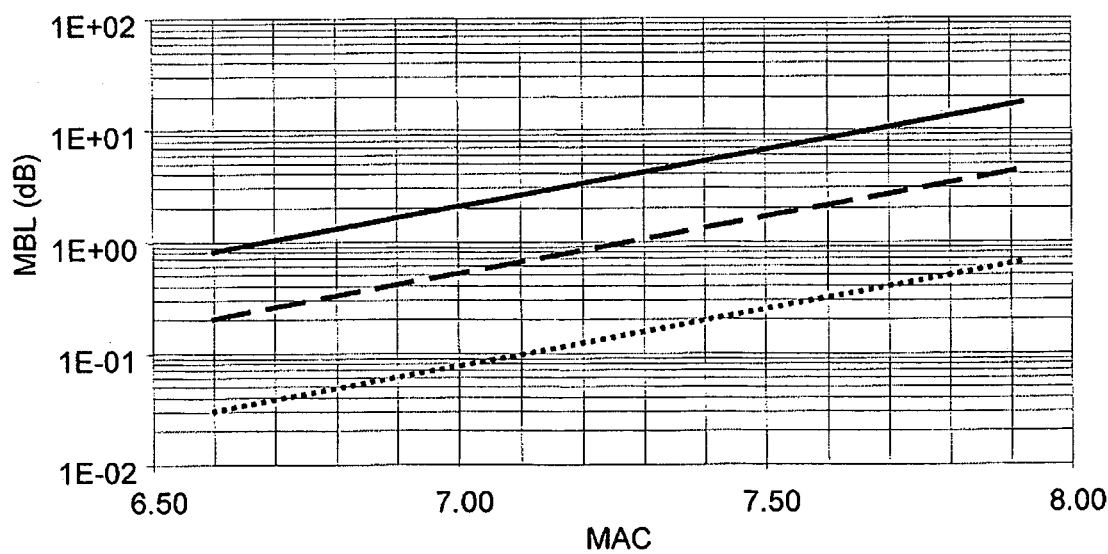
FIG. 13 is a plot reporting the macrobending loss (MBL) as a function of the MAC number for number for a standard single-mode optical fibre with no voids (solid line), a microstructured optical fibre with a ring of 2-4% local void density and ring thickness of about 10 μM (dashed line), and for microstructured optical fibre with a ring of 8-10% local void density and ring thickness of about 4-5 μm (dotted line).

FIG. 13 is a schematic diagram reporting the macrobending loss as a function of the MAC number for a standard single-mode optical fibre with no voids (solid line), a microstructured optical fibre with a ring of 2-4% local void density and ring thickness of about 10 μm (dashed line), corresponding to a value of $d_A$ of about 115 μm (FIG. 12), and for microstructured optical fibre with a ring of 8-10% local void density and ring thickness of about 4-5 μm (dotted line), corresponding to a value of $d_A$ of about 95 μm (FIG. 12). The MFD of the fibres is 8.6±0.4 μm. In particular, macrobending losses of not more than 0.1 dB are obtained for the microstructured fibre having $d_A$ of not more than about 95 μm (dotted line) and MAC number of not more than about 7.2. Values below 0.1 dB for the fibre represented by the dashed line would require MAC values below 6.5, which may be not desirable.

Figure 14:
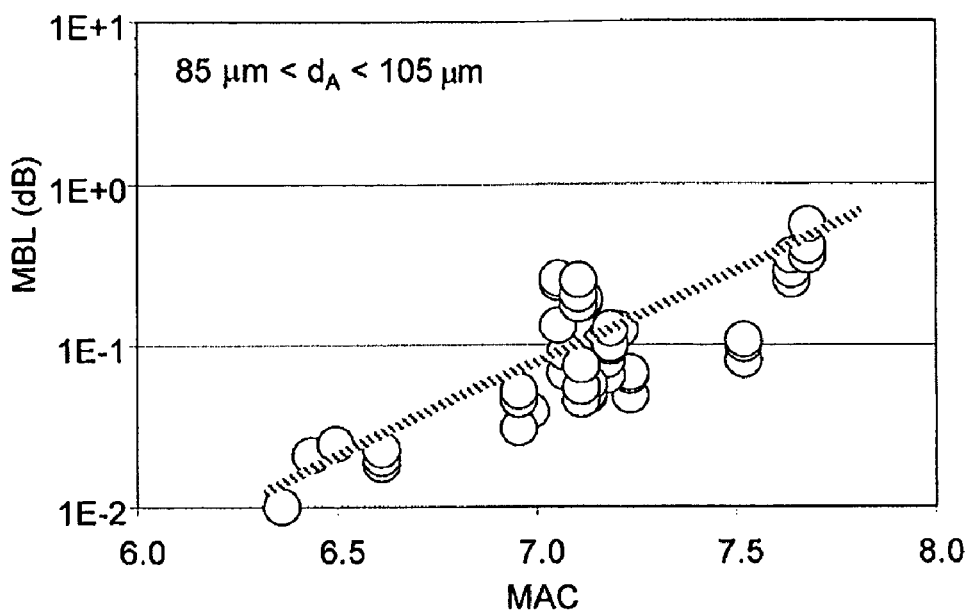
FIG. 14 is a plot showing the macrobending loss (MBL) as a function of the MAC number for a plurality of optical fibres (circles) having apparent diameter ranging from 85 to 105 μm.

FIG. 14 is a plot showing the macrobending loss as a function of the MAC number measured in a plurality of optical fibres, each circle representing a fibre having apparent diameter comprised between 85 μm and 105 μm. The line is a linear interpolation of the experimental values. The MFD of the fibres is 8.6±0.4 μm. Cable cut-off wavelength values range from 1150 nm to 1300 nm. Fibres with a MAC number comprised between 6.8 and 7.5 are preferably selected. MAC numbers smaller than about 6.8 imply a rather large cut-off wavelength that may not assure single-mode propagation in the operational wavelength range of interest, e.g., 1550 nm or 1310 nm.

Figure 15:
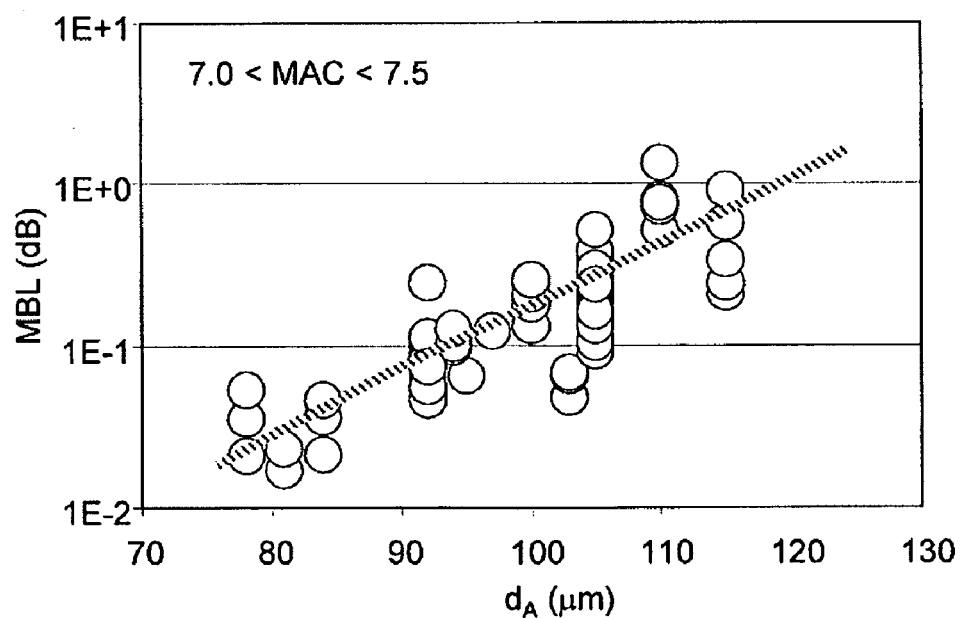
FIG. 15 is a plot showing the macrobending loss (MBL) as a function of the apparent diameter for a plurality of optical fibres having a MAC number comprised between 7.0 and 7.5, each circle representing a fibre of the plurality.

FIG. 15 is a plot showing the macrobending loss as a function of the apparent diameter for a plurality of optical fibres, each circle representing a fibre having a a measurement on a fibre of the plurality) having MAC number ranging from 7.0 to 7.5 with a MFD centred at about 8.6 μm and $\lambda_{cc}$ of less than 1260 nm. The line is a linear interpolation of the experimental values. For values of the apparent diameter of not more than 105 μm, macrobending loss is smaller than 0.5 dB. In some embodiments, values of the apparent diameter are selected so as to lead to a macrobending loss smaller than about 0.2 dB.

Values of apparent diameter of less than 80 μm exhibit good bending performances, but they are however less preferred because it may become more difficult to draw the optical fibre or to control the outer diameter of the fibre from the analysis of the interference pattern. Furthermore, such low values of apparent diameter may imply relatively large values of cut-off wavelengths, which may not ensure single-mode operation at wavelengths above 1250-1260 nm.

Applicant has understood that optical performance are affected by the radial distance of the void-containing annular region and the core. In case of a microstructured fibre having a structure as described with reference to FIG. 8, this radial distance is mainly determined by the radial width of the inner cladding layer.

As previously mentioned, a geometrical parameter that represents the radial distance from the low-density ring to the core is the core-to-clad diameter ratio. In general, larger values of core-to-clad ratio correspond to smaller radial distances from the annular region to the outer radius of core.

Applicant has understood that, although a core-to-clad ratio of more than 0.36, for instance equal to 0.40-0.43, would present advantages in the preform manufacturing, generally resulting in a higher fibre throughput, such relatively high values of core-to-clad ratio may render the optical fibre more vulnerable to the presence of optically-active impurities, especially due to water absorption in the preform soot. It has been observed that, for microstructured fibres with a core-to-clad ratio of about 0.40 or larger, light transmission exhibit a significant OH-peak at about 1380-1390 nm, which worsens the optical performances of the fibre, especially by increasing the attenuation of the propagating optical mode.

Applicant has understood that a parameter relating the geometrical characteristics of the optical fibre with some of its optical performances is the ratio between the internal diameter (ID) of the annular region (see e.g., FIG. 9) and the MFD, hereafter referred to as ID/MFD.

The optical mode propagating along the fibre is by large confined in the cross-sectional area of the core and evanescent tails of the mode may extend in the surrounding cladding layers. The shape of the optical mode and the portion and penetration depth of the mode evanescent tails depend, besides from the propagation wavelength, on refractive index of the core relative to the cladding (e.g., $\Delta_1$ in FIG. 9). In general, for single-mode transmission fibres, it may be advantageous not to exceed values of $\Delta_1$ larger than 0.4-0.5%, and thus, at the operational wavelengths of interest in the telecommunications (e.g., 1550 nm or 1310 nm), the evanescent tails of the fundamental optical mode generally penetrate to some extent into the cladding layers surrounding and in proximity of the core.

Applicant has understood that, if the ID/MFD ratio is sufficiently high, the presence of voids significantly affects the optical properties of the fibre only in the presence of a bend, as the fundamental optical mode penetrates the void-containing region principally only along the curved portions of the fibre. A sufficiently high value of ID/MFD implies a radial distance of the void-containing annular region from the core sufficiently large so that the fundamental optical mode can propagate essentially unperturbed along the straight portions of the fibre, whereas it remains confined by the voids in the annular region along the bended portions of the fibre, due to the drop in the refractive index created by the voids.

Preferably, the ratio ID/MFD is comprised between 2.5 and 3.2. In some preferred embodiments, the ratio ID/MFD is comprised between 2.6 and 3.0. Preferably, the core-to-clad ratio is comprised between 0.30 and 0.36.

Preferably, the MFD is comprised between 8 μm and 9 μm, preferably between 8.2 μm and 8.8 μm.

Figure 16:
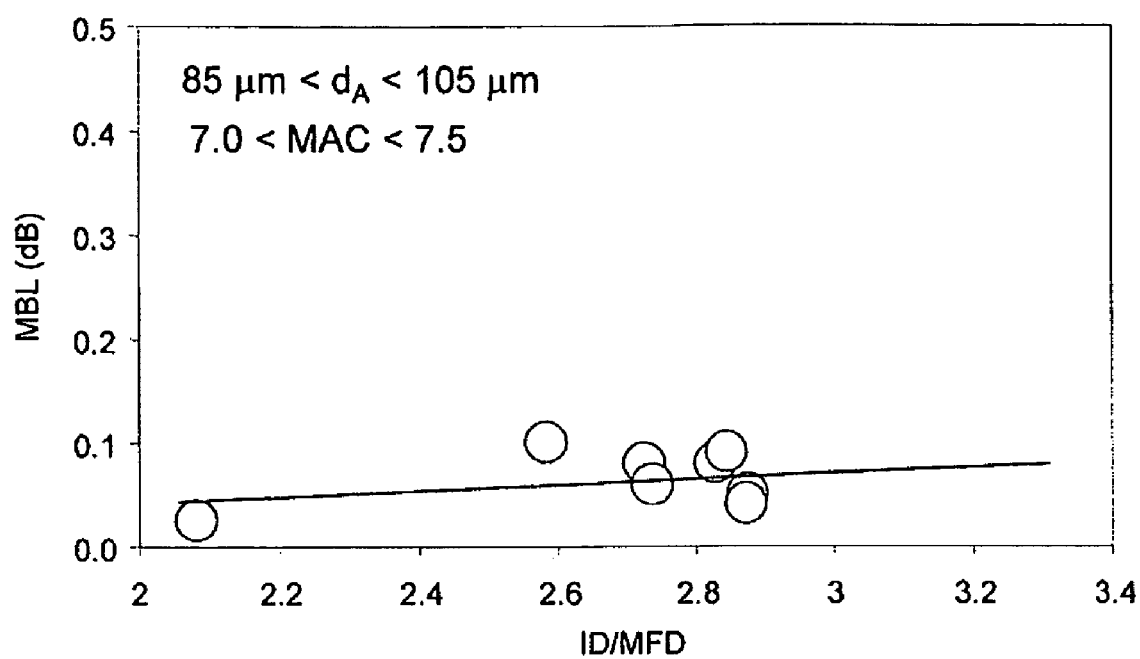
FIG. 16 is a plot showing the macrobending loss (MBL) as a function of the ratio between the inner diameter of the void-containing annular region and the MFD, ID/MFD, for optical fibres (circles) exhibiting an apparent diameter comprised between 85 to 105 μm and a MAC number from 7.0 to 7.5.

FIG. 16 is a plot the macrobending loss as a function of the ratio between the inner diameter of the void-containing annular region and the MFD for optical fibres (circles) exhibiting an apparent diameter comprised between 85 to 105 μm and a MAC number from 7.0 to 7.5. Solid line is a linear interpolation of the experimental values.

Notably, results reported in FIG. 16 indicate that the macrobending loss is basically independent of the ratio ID/MFD, within a large range of values of ID/MFD.

Therefore, advantageously, the optical fibre according to an aspect of the present invention has optical transmission characteristics substantially lacking in the water-related attenuation peaks while exhibiting macrobending loss significantly less than 1 dB, e.g., of less than about 0.5 dB and preferably less than about 0.2 dB.

In some preferred embodiments, voids have an average diameter of 1 μm, the smallest diameter being of about 0.1 μm and the largest diameter being of about 1.9 μm.

The invention claimed is:

1. A process for manufacturing a microstructured optical fibre comprising a void-containing region, the fibre having an outer surface defining an outer diameter, comprising the steps of:

drawing a microstructured optical fibre along a longitudinal direction from a heated preform, wherein the optical fibre is continuously advanced along the longitudinal direction;

directing a radiation beam at a longitudinal position in the longitudinal direction of the optical fibre so as to produce an interference pattern;

detecting the interference pattern and producing at least one electrical detection signal corresponding to the interference pattern and comprising a plurality of signal wave fringe cycles;

feeding the at least one detection signal into a first counter circuit;

determining a first number of interference fringe increments in the plurality of signal wave fringe cycles of the at least one detection signal by using the first counter circuit;

determining the outer diameter of the optical fibre; and controlling the microstructure of the optical fibre during advancement of the optical fibre, wherein the step of controlling comprises at least one step selected from:

(a) controlling the first number of interference fringe increments within a reference number range of reference numbers of interference fringe increments, the reference numbers being smaller than a second number of interference fringe increments related to the outer diameter of the microstructured optical fibre by a conversion factor; and (b) calculating a microstructure length value by multiplying the first number of interference fringe increments by a conversion factor and controlling the value of the microstructure length value within a reference length range of reference microstructure length values, the reference microstructure length values being smaller than the outer diameter of the microstructured optical fibre.

2. The process of claim 1, further comprising, in the case of at least one microstructure parameter selected from the determined first number of interference fringe increments and the determined microstructure length value outside the relevant reference range, the step of:

varying at least one first drawing parameter selected from down-feed speed, drawing speed, gas flow within the furnace and furnace temperature to cause the at least one microstructure parameter to lie within said relevant reference range.

3. The process of claim 2, further comprising the step of:
varying at least one second drawing parameter, different from the first drawing parameter, selected from down-feed speed, drawing speed, gas flow within the furnace and furnace temperature to maintain the outer diameter at an approximately constant value.

4. The process of claim 3, further comprising the step of:
varying at least one third drawing parameter, different from the first and the second drawing parameters, selected from down-feed speed, drawing speed, gas flow within the furnace and furnace temperature to maintain the drawing tension at an approximately constant value.

5. The process of claim 1, further comprising, in the case of at least one microstructure parameter selected from the determined first number of interference fringe increments and the determined microstructure length value outside the relevant reference range along a length portion of the optical fibre, the step of marking the length portion.

6. The process according to claim 5, further comprising the step of winding the advancing optical fibre onto a support according to a winding pitch, and wherein the step of marking is performed by changing the winding pitch in correspondence to the length portion of the optical fibre.

7. The process of claim 1, further comprising, after the step of detecting the interference pattern and before the step of feeding the at least one detection signal, the step of splitting the at least one detection signal into a first and a second signal, wherein the step of feeding the at least one detection signal is performed by feeding the first signal into the first counter circuit, and
wherein the step of determining the outer diameter of the optical fibre comprises the steps of:
electrically filtering the second signal to remove signal components related to the void-containing region from the second signal and to produce a filtered signal having a substantially unperturbed plurality of interference fringe cycles;
feeding the filtered signal into a second counter circuit;
determining a second number of interference fringe increments in the plurality of signal wave fringe cycles of the filtered signal by using the second counter circuit; and
calculating a value of the outer diameter by multiplying the second number of interference fringe increments by a conversion factor.

8. The process of claim 7, wherein the step of electrically filtering the second signal comprises the step of removing the signal components at frequencies smaller than a fundamental frequency associated with the outer diameter of the microstructured fibre in the frequency spectrum of the interference pattern.

9. The process of claim 8, wherein the step of electrically filtering comprises using a high-pass electrical filter having a −3 dB cut-off frequency between 80% and 90% of the fundamental frequency.

10. The process of claim 8, wherein the step of electrically filtering comprises using a band-pass electrical filter comprising a pass band having a −3 dB position on the low-frequency edge with positive slope of the pass band between 80% and 90% of the fundamental frequency.

11. The process of claim 1, wherein the at least one detection signal is at least a first and a second signal, and the step of feeding the at least one detection signal is performed by feeding the first signal into the first counter circuit, and wherein the step of determining the outer diameter of the optical fibre comprises the steps of:
electrically filtering the second signal to remove signal components related to the void-containing region from the second signal and to produce a filtered signal having a substantially unperturbed plurality of interference fringe cycles;
feeding the filtered signal into a second counter circuit;
determining a second number of interference fringe increments in the plurality of signal wave fringe cycles of the filtered signal by using the second counter circuit; and
calculating a value of the outer diameter by multiplying the second number of interference fringe increments by a conversion factor.

12. The process of claim 1, wherein the reference numbers and the reference microstructure length values are between 0.6 and 0.9 times the second number of interference fringe increments and the outer diameter, respectively.

13. The process of claim 1, wherein the reference numbers and the reference microstructure length values are between 0.64 and 0.84 times the second number of interference fringe increments and the outer diameter, respectively.

14. The process of claim 1, wherein the microstructured optical fibre comprises a core region and an outer cladding region surrounding the core region and wherein the void-containing region is an annular region within the outer cladding region.

15. The process of claim 1, wherein the interference pattern is a far-field scattering pattern caused by the interference between the radiation reflected from the outer surface of the microstructured optical fibre and the radiation refracted by the optical fibre.

16. A method for controlling a microstructured optical fibre comprising a void-containing region, the fibre having an outer surface defining an outer diameter and extending along a longitudinal direction, comprising the steps of:
directing a radiation beam at a longitudinal position of the optical fibre so as to produce an interference pattern;
detecting the interference pattern and producing at least one electrical detection signal corresponding to the interference pattern and comprising a plurality of signal wave fringe cycles;
feeding the at least one detection signal into a counter circuit;
determining a first number of interference fringe increments in the plurality of signal wave fringe cycles of the at least one detection signal by using the counter circuit; and
controlling the microstructure of the optical fibre, wherein the step of controlling comprises at least one step selected from:
(a) controlling the first number of interference fringe increments within a reference number range of reference numbers of interference fringe increments, the reference numbers being smaller than a second number of interference fringe increments related to the outer diameter of the microstructured optical fibre by a conversion factor; and
(b) calculating a microstructure length value by multiplying the first number of interference fringe increments by a conversion factor and controlling the value of the microstructure length value within a reference length range of reference microstructure length values, the reference microstructure length values being smaller than the outer diameter of the microstructured optical fibre.

17. A microstructure control system for controlling a microstructured optical fibre extending along a longitudinal direction, having an outer surface defining an outer diameter and comprising a void-containing region, comprising:
- a light source for generating a radiation beam to be directed onto a longitudinal position of the microstructured optical fibre so as to form an interference pattern;
- at least one detector for detecting the interference pattern and for producing a first and a second electrical detection signal corresponding to the interference pattern, each first and second detection signal comprising a plurality of signal wave fringe cycles;
- a first counter circuit for receiving the first detection signal, the first counter circuit capable of determining a first number of interference fringe increments in the plurality of signal wave fringe cycles of the first detection signal;
- an electrical filter for filtering the second detection signal and capable of removing the signal components related to the void-containing region from the second detection signal and to produce a filtered signal having a substantially unperturbed plurality of interference fringe cycles; and
- a second counter circuit for receiving the filtered signal, the second counter circuit being capable of determining a second number of interference fringe increments in the plurality of signal wave fringe cycles of the filtered signal, the second number being related to the outer diameter of the microstructured optical fibre.

18. The system of claim 17, further comprising a control unit capable of receiving first and second numbers of interference fringe increments and of controlling the first number of interference fringe increments within a reference number range of reference numbers of interference fringe increments related to a microstructure of the optical fibre, the reference numbers being smaller than the second number of interference fringe increments.

19. The system of claim 17, further comprising a control unit capable of receiving first and second numbers of interference fringe increments and of controlling a microstructure length value obtained by multiplying the first number of interference fringe increments by a conversion factor within a reference length range of reference microstructure length values, the reference values being smaller than the outer diameter of the microstructured optical fibre obtained by multiplying the second number of interference fringe increments by the conversion factor.

20. The system of claim 17, wherein the at least one detector comprises no more than one detector and further comprising a splitter arranged downstream the detector for splitting a signal output from the detector into the first and second signals.

21. The system of claim 17, wherein the electrical filter is a high-pass electrical filter having a −3 dB cut-off frequency between 80% and 90% of the fundamental frequency.

22. The system of claim 17, wherein the electrical filter is a band-pass electrical filter comprising a pass band having a −3 dB position on the low-frequency edge with positive slope of the pass band between 80% and 90% of the fundamental frequency.

* * * * *